United States Patent
Wang et al.

(10) Patent No.: US 11,960,887 B2
(45) Date of Patent: Apr. 16, 2024

(54) GRAPHICS PROCESSING UNIT AND CENTRAL PROCESSING UNIT COOPERATIVE VARIABLE LENGTH DATA BIT PACKING

(71) Applicant: Intel Corporation, Santa Clara, CA (US)

(72) Inventors: Bin Wang, Beijing (CN); Bo Peng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/795,170

(22) PCT Filed: Mar. 3, 2020

(86) PCT No.: PCT/CN2020/077516
§ 371 (c)(1),
(2) Date: Jul. 25, 2022

(87) PCT Pub. No.: WO2021/174405
PCT Pub. Date: Sep. 10, 2021

(65) Prior Publication Data
US 2023/0084704 A1    Mar. 16, 2023

(51) Int. Cl.
*G06F 9/30* (2018.01)
*H04N 19/00* (2014.01)

(52) U.S. Cl.
CPC ...... *G06F 9/30032* (2013.01); *G06F 9/30036* (2013.01); *H04N 19/00* (2013.01)

(58) Field of Classification Search
CPC .. G06F 9/30032; G06F 9/30036; G06F 9/544; G06F 5/00; H04N 19/00
See application file for complete search history.

(56) References Cited

U.S. PATENT DOCUMENTS

| 5,717,394 | A | * | 2/1998 | Schwartz | ............. | H04N 19/00 375/E7.231 |
| 5,822,552 | A | * | 10/1998 | Shim | ............. | H04N 19/00 712/210 |
| 10,127,624 | B1 | * | 11/2018 | Lassahn | ............. | H04N 7/00 |
| 2006/0165180 | A1 | * | 7/2006 | Koyama | ............. | H04N 19/70 375/E7.199 |

(Continued)

FOREIGN PATENT DOCUMENTS

| CN | 108596824 | 9/2018 |
| WO | 2017019183 | 2/2017 |

OTHER PUBLICATIONS

Su et al.; A High-Efficient Software Parallel CAVCL Encoder Based on GPU; 2011; IEEE (Year: 2011).*

(Continued)

*Primary Examiner* — Corey S Faherty
(74) *Attorney, Agent, or Firm* — Essential Patents Group, LLP

(57) ABSTRACT

Techniques related to packing pieces of data having variable bit lengths to serial packed data using a graphics processing unit and a central processing unit are discussed. Such techniques include executing bit shift operations for the pieces of data in parallel via execution units of the graphics processing unit and packing the bit shifted pieces of data via the central processing unit.

20 Claims, 13 Drawing Sheets

(56) References Cited

U.S. PATENT DOCUMENTS

| | | | |
|---|---|---|---|
| 2010/0057810 A1* | 3/2010 | El | H03M 7/40 |
| | | | 707/754 |
| 2019/0146857 A1 | 5/2019 | Lebeane et al. | |
| 2019/0294643 A1 | 9/2019 | Shi et al. | |
| 2019/0340725 A1 | 11/2019 | Amento et al. | |
| 2021/0049463 A1* | 2/2021 | Ruff | G06N 3/045 |

OTHER PUBLICATIONS

Santos et al.; Highly-Parallel GPU Architecture for Lossy Hyperspectral Image Compression; 2013; IEEE (Year: 2013).*
International Search Report and Written Opinion for PCT Patent Application No. PCT/CN2020/077516, dated Dec. 4, 2020.
Wikipedia, "SIMD", retrieved online on Dec. 17, 2019 via https://en.wikipedia.org/wiki/SIMD.
Wikipedia, "Variable-length code", retrieved online on Dec. 17, 2019 via https://en.wikipedia.org/wiki/variable-length_code.
International Preliminary Report on Patentability for PCT Patent Application No. PCT/CN2020/077516, dated Sep. 15, 2022.

* cited by examiner

GRAPHICS PROCESSING UNIT AND CENTRAL PROCESSING UNIT COOPERATIVE VARIABLE LENGTH DATA BIT PACKING

CLAIM OF PRIORITY

This Application is a National Stage Entry of, and claims priority to, PCT Application No. PCT/CN2020/077516, filed on 3 Mar. 2020 and titled "GRAPHICS PROCESSING UNIT AND CENTRAL PROCESSING UNIT COOPERATIVE VARIABLE LENGTH DATA BIT PACKING", which is incorporated by reference in its entirety for all purposes.

BACKGROUND

In parallel computing contexts, multiple compute resources are used simultaneously to solve computational problems. Due to the use of multiple process units, such techniques attain better performance than traditional serial computing in terms of speed and throughput. Typically, the output data of each process unit has a fixed length, such that the output data can be stored in a fixed location. However, in some contexts, the output data has a variable bit length (i.e., has a variable length in bits), and the output data must be packed for serial execution by a central processing unit or other processor in the process flow. Such packing is time intensive and may be a bottleneck in the system processing.

It may be advantageous to perform bit packing with higher efficiency in terms of speed and throughput for improved system performance. It is with respect to these and other considerations that the present improvements have been needed. Such improvements may become critical as the desire to implement parallel variable bit length compute environments and systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
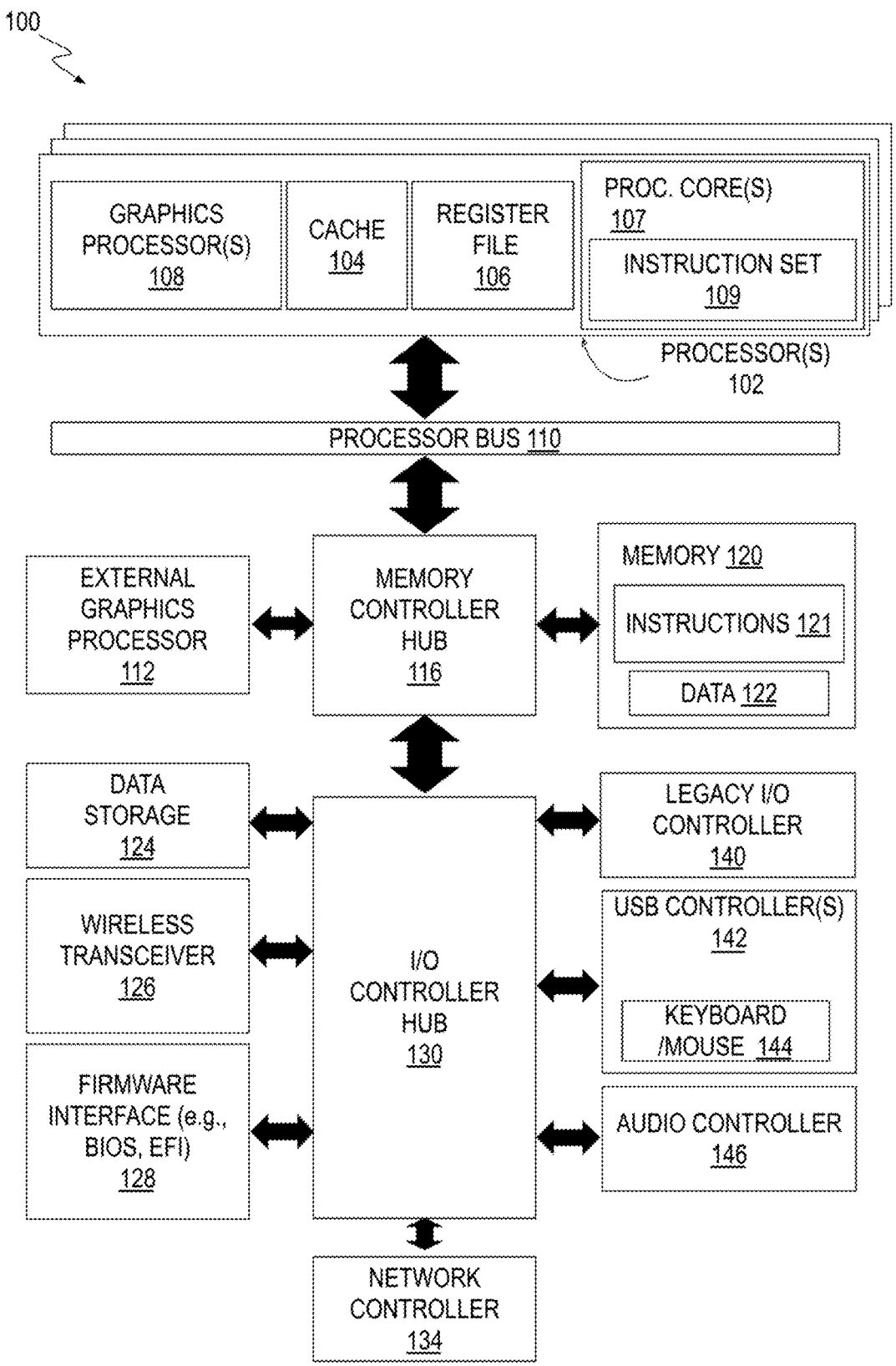
FIG. 1 is a block diagram of a data processing system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "implementation(s)", "example(s)", "embodiment(s)", etc., indicate that the implementation, example, or embodiment described may include a particular feature, structure, characteristic, or the like, but every implementation, example, or embodiment may not necessarily include the particular feature, structure, or characteristic. Moreover, such phrases are not necessarily referring to the same implementation, example, or embodiment. Further, when a particular feature, structure, or characteristic is described in connection with an implementation, example, or embodiment, it is submitted that it is within the knowledge of one skilled in the art to affect such feature, structure, or characteristic in connection with other implementations, examples, or embodiments whether or not explicitly described herein.

Methods, devices, apparatuses, computing platforms, and articles are described herein related to bit packing variable length data and, in particular, to bit packing variable length data using parallel bit shift operations and subsequent packing of the bit shifted data.

As described above, in some contexts, multiple process units may each generate a piece of data such that the pieces of data are variable in bit length. As used herein, the term variable bit length or similar terms indicate that a length of a piece of data is not known (or fixed) and may therefore vary across multiple pieces of data. Notably, such variable bit length pieces of data may each be generated by a process unit operating in parallel. In some embodiments, the variable bit length pieces of data are generated by one or more variable length coding (VLC) operations such as VLC image or video coding operations.

Such variable bit length pieces of data must be packed for subsequent processing. For example, such subsequent processing may be serial processing by a central processing unit (CPU) after the variable bit length pieces of data are generated in parallel by a graphics processing unit (GPU). Such serial processing may be any suitable processing and, in preparation for the processing, the variable bit length pieces of data may be stored to CPU memory (i.e., memory accessible to the CPU but not the GPU). As used herein, the terms packing, bit packing, and other similar terms indicate packing pieces of data and the bits thereof such that, after packing, the pieces of data are contiguous with no gaps between the pieces of data. In a memory having multiple serial bytes of the memory, packed variable bit length pieces of data are packed in the serial bytes such that the serial bytes, prior to a final byte, have no bit gaps therein. Depending on the size of the packed data, the final byte may have a gap after all of the prior packed data bits.

For example, given multiple pieces of data having variable bit lengths, each of the multiple pieces of data has a lead bit that is addressed at a first bit of a particular byte of memory. Each of the multiple pieces of data is then within one or more bytes such that the last byte is either filled with bits (if the piece of data divided by the byte size has no remainder) or the last byte is unfilled. After packing, the first piece of data is packed starting with the lead bit at a first bit of a particular byte of memory. Each piece of data is then packed thereafter such that all bytes are filled with bits. Notably, any previously unfilled bytes are filled beginning with the lead bit of the next piece of data (at any pertinent location within a byte and not necessarily at a first bit of a byte as was the case prior to packing). Such packing continues through the bytes of the serial data that the packed pieces of data are stored in for serial processing.

As discussed further herein, such packing of pieces of data having variable bit lengths is performed such that bit shifts for the pieces of data are performed in parallel using multiple execution units (EUs) of a GPU (e.g., one execution unit dedicated to one piece of data that needs to be bit shifted). Subsequent to bit shifting, a CPU then completes the packing by performing a bitwise OR operation on the first byte of each shifted piece of current data and a last byte of each shifted piece of prior data (which includes remainder bits as discussed further herein) to generate a byte of data having the lead bit of the shifted piece of current data immediately following the remainder bits of the piece of prior data. The CPU further completes the packing by following the discussed byte with remaining bytes of the shifted piece of current data using copy operations. Thereby, serial packed data are generated from the pieces of data having variable bit lengths. The serial packed data is stored to CPU accessible memory for serial processing by the CPU. As used herein, the terms piece of current data, piece of prior data, and piece of subsequent data are used to indicate the relative positions of pieces of data in a sequential order. Notably, relative to a piece of current data, a piece of prior data immediately precedes the piece of current data and a piece of subsequent data immediately follows the piece of current data. Furthermore, each piece of data of the many pieces of data for packing may be characterized as a piece of current data and other data in or around it may be characterized as a piece of prior data or a piece of subsequent data depending on context.

The techniques discussed herein may be implemented in any suitable architecture. In some embodiments, a GPU and a CPU both have access to a shared memory (e.g., GPU accessible and CPU accessible memory) as well as unshared memory (e.g., a GPU only accessible memory and a CPU only accessible memory). Such memory architectures may be provided by separate physical memories (e.g., separate monolithic integrated circuit (IC) devices) or by the same physical memory partitioned into accessible memory regions. In some embodiments, the GPU access shared memory to attain pieces of data having variable bit lengths performs bit shifting as discussed herein, and stores the bit shifted pieces of data back to the shared memory. The CPU may then access the shared memory and perform bitwise OR operations and copy operations to pack the bit shifted pieces of data to a CPU only accessible memory for serial processing.

Furthermore, the discussed techniques provide for packed serial data for serial execution by a CPU. The input data for packing may be any suitable pieces of data having variable bit lengths. In some embodiments, the input pieces of data are each from an execution unit of a GPU operating in parallel. As discussed herein, cooperative GPU and CPU operations are provided for packing variable length data in parallel that perform bit shift operations in parallel at the GPU and can perform data packing on multiple sets of pieces of data in parallel between the GPU and CPU. Such techniques may attain 10× performance or more relative to serial data packing. In some embodiments, a workload is divided into parts and executed on a CPU and a GPU in parallel. For example, bit shift values may first be determined for each piece of data as a value from zero to seven (e.g., using a byte based memory architecture). For example, the bit shift values may be determined by a CPU. A GPU is then employed to perform bit shift operation for each piece of data having a bit shift value in parallel using multiple EUs and single instruction multiple data (SIMD) instructions. Next, via the CPU, a bitwise OR operation is applied to the first byte of each piece of current shifted data and the last byte of the corresponding piece of prior shifted and memory copy operations are applied to remaining bytes of each piece of current shifted data (prior to the last byte thereof) to provide the packed serial data. In some embodiments, the CPU and GPU system may further perform the bitwise OR operations and copy operations running on the CPU for a first set of pieces of data (a first data set) concurrently with bit shift operation on the GPU for a second set of pieces of data (a second data set).

FIG. 1 is a block diagram of a data processing system 100, arranged in accordance with at least some implementations of the present disclosure. Data processing system 100 includes one or more processors 102 and one or more graphics processors 108, and may be a single processor desktop system, a multiprocessor workstation system, or a server system having a large number of processors 102 or processor cores 107. In one embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
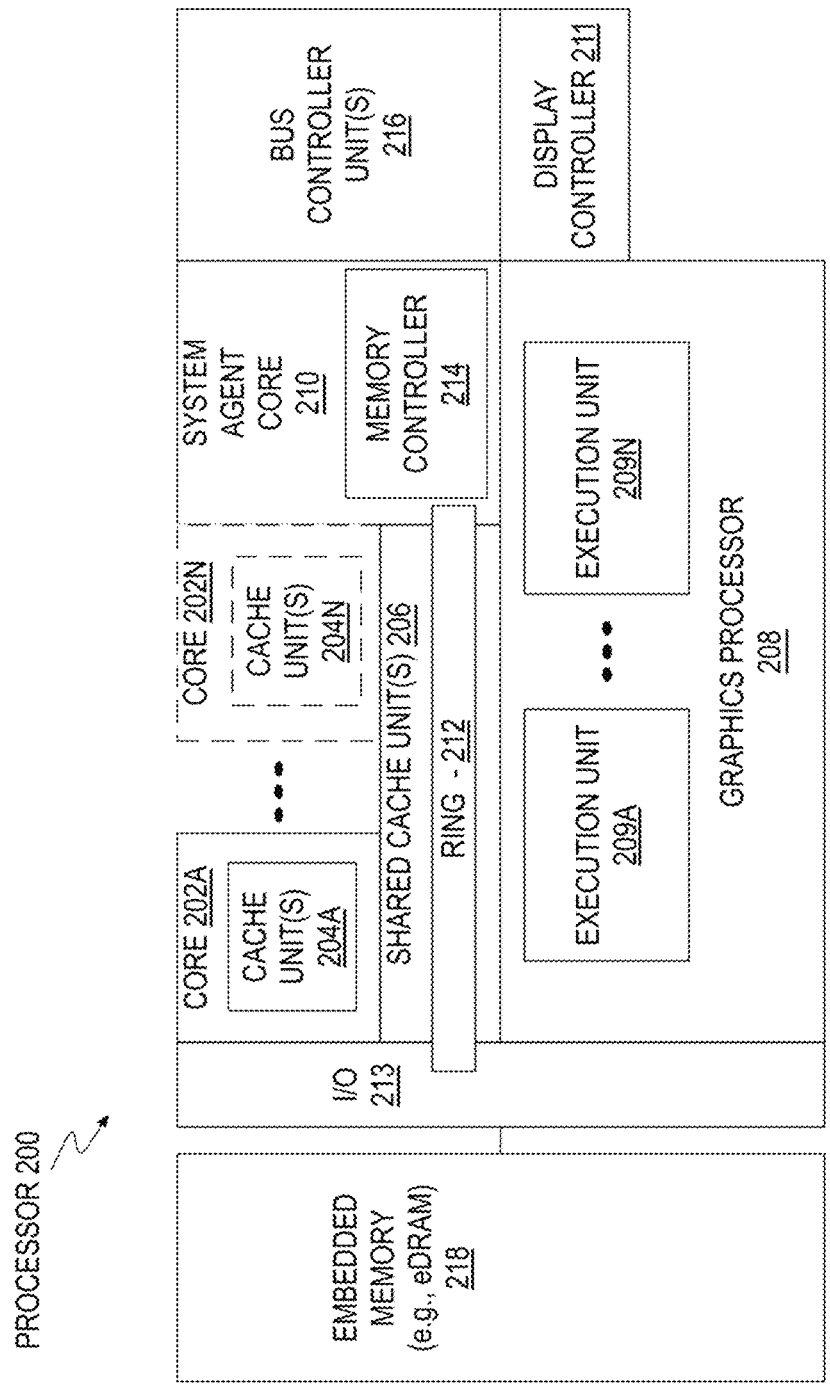
FIG. 2 is a block diagram of an embodiment of a processor having one or more processors cores, an integrated memory controller, and an integrated graphics processor having one or more execution units.

FIG. 2 is a block diagram of an embodiment of a processor 200 having one or more processor cores 202A-N, an integrated memory controller 214, and an integrated graphics processor 208 having one or more execution units 209A-N, arranged in accordance with at least some implementations of the present disclosure. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiments, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. Graphics processor 208 includes any number of execution units 209A-N, which are discrete units for performing separable and potentially parallelized operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a System-On-Chip (SOC) integrated circuit having the illustrated components, in addition to other components.

Figure 3:
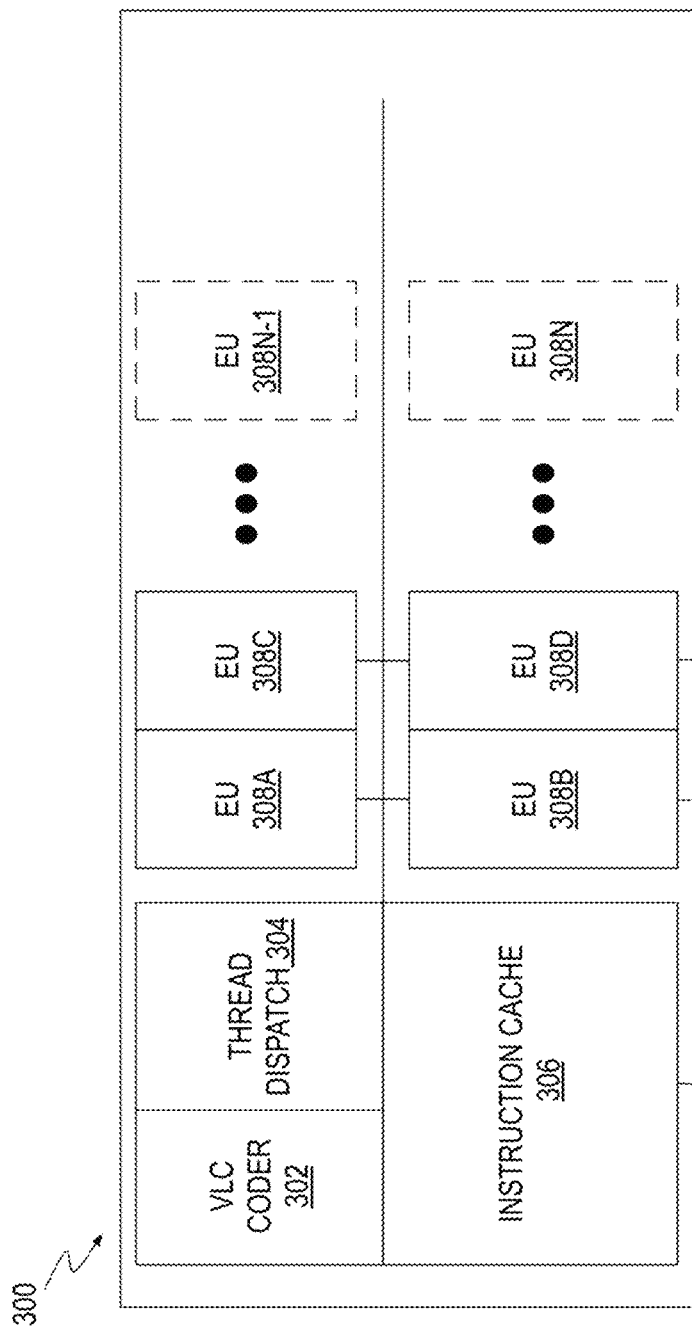
FIG. 3 illustrates thread execution logic including an array of processing elements employed in some embodiments of a graphics processing unit.

FIG. 3 illustrates thread execution logic 300 including an array of processing elements employed in some embodiments of a graphics processing unit, arranged in accordance with at least some implementations of the present disclosure. Elements of FIG. 3 having the same reference numbers (or names) as the elements of any other figure herein can operate or function in any manner similar to that described elsewhere herein, but are not limited to such.

In some embodiments, thread execution logic 300 includes a variable length coding (VLC) coder 302, a thread dispatcher 304, instruction cache 306, and a scalable execution unit array including a plurality of execution units 308A-N. In one embodiment, the included components are interconnected via an interconnect fabric that links to each of the components. In some embodiments, thread execution logic 300 includes one or more connections to memory, such as system memory, shared memory, or cache memory, through one or more of instruction cache 306 and execution unit array 308A-N. In some embodiments, each execution unit (e.g. 308A) is an individual vector processor capable of executing multiple simultaneous threads and processing multiple data elements in parallel for each thread. In some embodiments, execution unit array 308A-N includes any number individual execution units.

In some embodiments, execution unit array 308A-N is used to execute VLC programs and bit shift operations as discussed herein. In some embodiments, the execution units in array 308A-N execute an instruction set that includes native support for standard instructions. Each execution unit in execution unit array 308A-N operates on data elements. The number of data elements is the execution size, or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 308A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 306) are included in the thread execution logic 300 to cache thread instructions for the execution units. In some embodiments, one or more data caches are included to cache thread data during thread execution. During execution, the graphics pipelines send thread initiation requests to thread execution logic 300 via thread spawning and dispatch logic. In some embodiments, thread execution logic 300 includes a local thread dispatcher 304 that arbitrates thread initiation requests from the graphics and media pipelines and instantiates the requested threads on one or more execution units 308A-N.

In some embodiments, VLC coder 302 is invoked to compute output pieces of data and cause results to be written to a shared memory. For example, VLC coder 302 may generate variable length pieces of data that must be subsequently serialized for processing by a CPU. In some embodiments, a data port provides a memory access mechanism for the thread execution logic 300 to output processed data such as pieces of data of variable lengths to a memory that is shared with a CPU as discussed further herein. Furthermore, EUs 308A-N may be employed for bit shift operations as discussed below.

Figure 4:
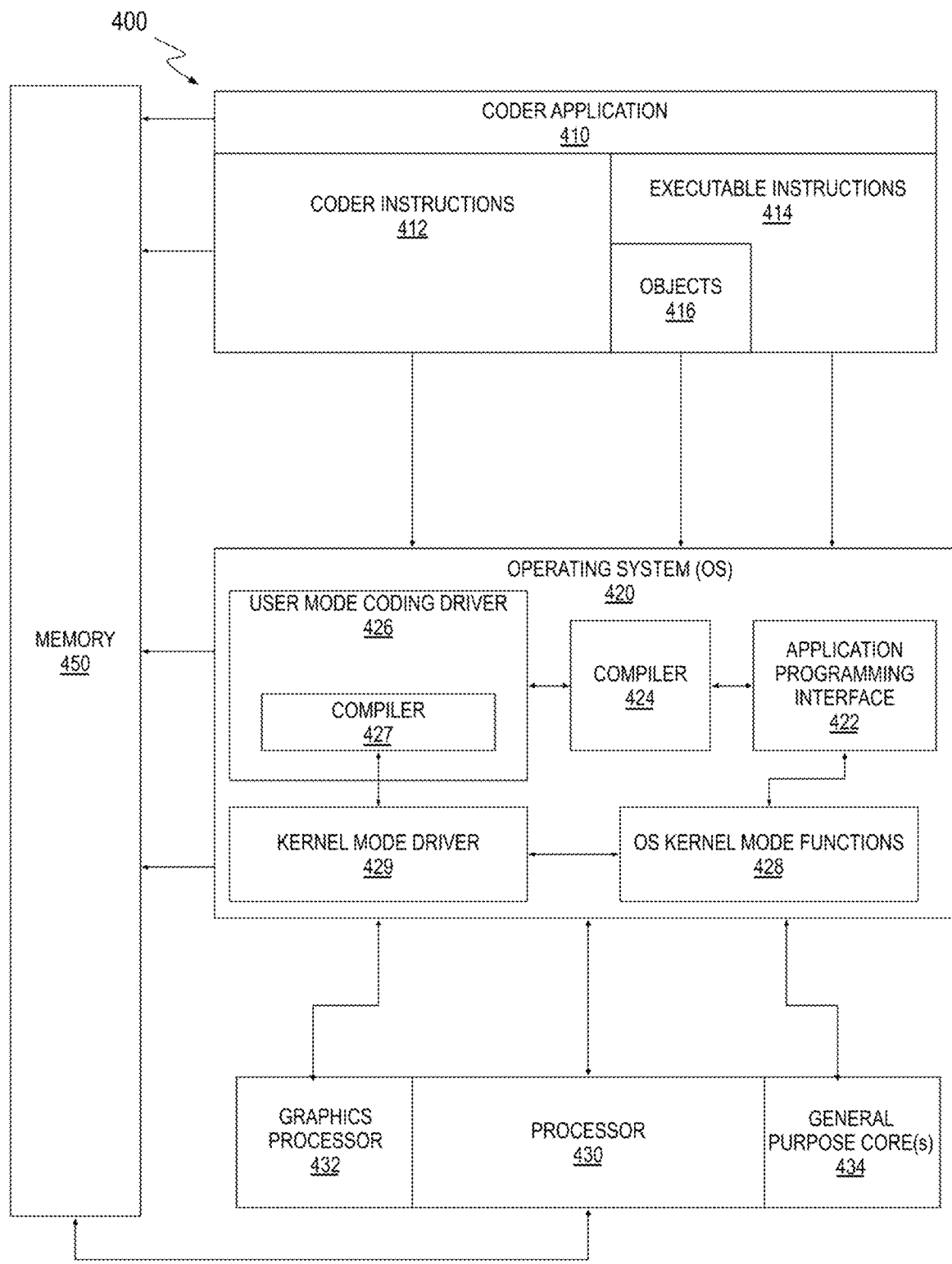
FIG. 4 illustrates exemplary software architecture for a data processing system.

FIG. 4 illustrates exemplary software architecture 400 for a data processing system, arranged in accordance with at least some implementations of the present disclosure. Software architecture includes a coder application 410, an operating system 420, and at least one processor 430. In some embodiments, processor 430 includes a graphics processor 432 and one or more general-purpose processor core(s) 434. Coder application 410 and operating system 420 each execute in the system memory 450 of the data processing system.

In some embodiments, coder application 410 contains one or more coding programs including coder instructions 412. The coder language instructions may be in a high-level shader language. The application also includes executable instructions 414 in a machine language suitable for execution by the general-purpose processor core 434. The application also includes objects 416 defined by the data being processed. In some embodiments, operating system 420 is a Microsoft® Windows® operating system from the Microsoft Corporation, a proprietary UNIX-like operating system, or an open source UNIX-like operating system using a variant of the Linux kernel. For example, compiler 424 may compile any coder instructions 412 provided via an application programming interface 422 into a lower-level language. The compilation may be a just-in-time (JIT) compilation or the application can perform pre-compilation. In some embodiments, user mode coding driver 426 contains a compiler 427 to convert coder instructions 412 into a hardware specific representation. In some embodiments, user mode coding driver 426 uses operating system kernel mode functions 428 to communicate with a kernel mode driver 429. In some embodiments, kernel mode driver 429 communicates with graphics processor 432 to dispatch commands and instructions to perform operations as discussed herein.

Figure 5:
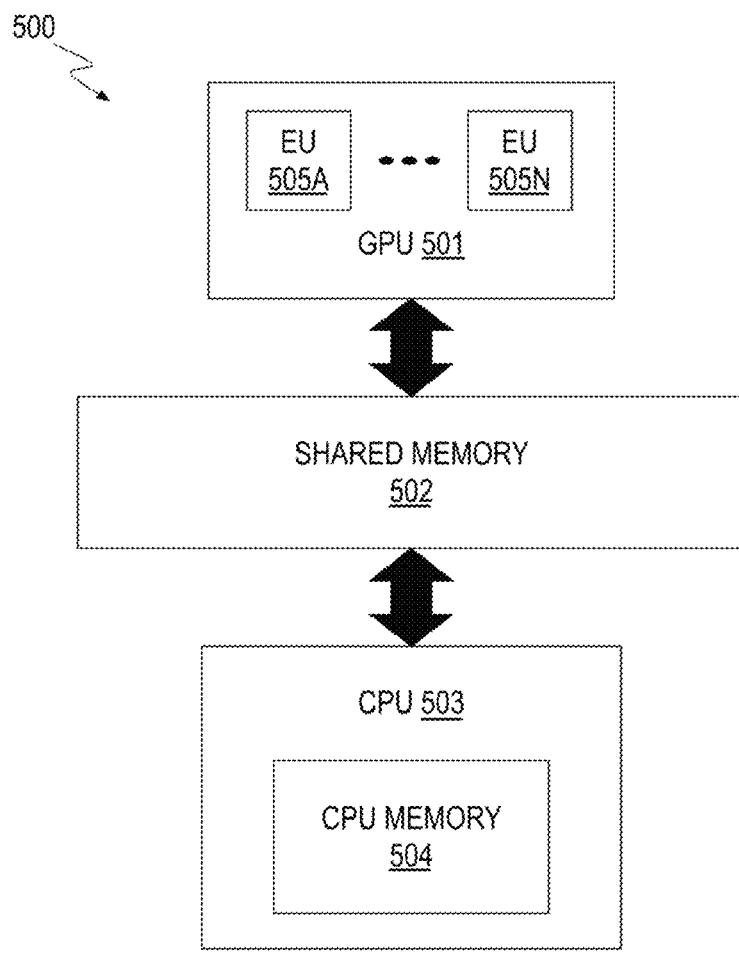
FIG. 5 is a block diagram of an exemplary system for packing variable length data for serial processing.

FIG. 5 is a block diagram of an exemplary system 500 for packing variable length data for serial processing, arranged in accordance with at least some implementations of the present disclosure. As shown in FIG. 5, system 500 includes a GPU 501, a shared memory 502, and a CPU 503 having a CPU memory 504. GPU 501 may also have a dedicated GPU memory, which is not shown in FIG. 5. System 500 may include any characteristics discussed herein. Notably, GPU 501 includes any number of EUs 505A-N for parallel bit shift operations as discussed herein.

GPU 501 and CPU 503 may both access and/or manipulate data in shared memory 502. Therefore, shared memory 502 may be characterized as GPU accessible and CPU accessible. However, only CPU 503 may access and/or manipulate data in CPU memory 504 and CPU memory 504 may be characterized as CPU only accessible memory, GPU inaccessible memory, or the like. As discussed further herein, GPU 501 generates variable bit length pieces of data and stores them to shared memory 502. Each of such variable bit length pieces of data have any length and are stored such that the lead bit thereof is at the first bit position of a particular (first) byte of memory. The subsequent bits of each variable bit length piece of data are sequentially stored in any number of bytes through a last byte of memory of the variable bit length piece of data. The last byte may be filled or unfilled depending on the size of the variable bit length piece of data with those variable bit length pieces of data having a length divided by the byte size leaving no remainder having a last filled byte and those with a remainder having a last unfilled byte.

In any case, each of the variable bit length pieces of data share the characteristic that each of their lead bits is at a first bit position of a particular byte of memory. Such a memory structure may be characterized as byte aligned as each piece of data begins aligned with a first bit of a byte. Notably, such a memory structure is not suitable for serial processing by CPU 503 and such variable bit length pieces of data must be packed in serial.

For each piece of data of the variable bit length pieces of data, a bit shift value is generated, for example, by CPU 503. In some embodiments, CPU 503 accesses the variable bit length pieces of data in shared memory or the size thereof and, based on the size, generates the bit shift value for each. For example, the bit shift value for the first (index 0) piece of data is zero and the bit shift value for each subsequent piece of data (indexed 1–N) is the modulo of the sum of the size of all pieces of data up to but not including the current piece of data (e.g., sum of the sizes of pieces of data 0–x for current piece of data x+1) by the size of each byte (e.g., 8).

GPU 501 accesses the variable bit length pieces of data in shared memory 502 and performs, in parallel, a bit shift (according to the bit shift value determined by CPU 503, if any) on each piece of data. For example, a first EU of EUs 505A-N processes a first piece of data, a second EU of EUs 505A-N processes a second piece of data, a third EU of EUs 505A-N processes a third piece of data, and so on such that such bit shift operation processing is performed at least partially in parallel via the parallel architecture of GPU 501. Such bit shifted pieces of data (of the same length as prior to bit shifting) are then stored back to shared memory 502.

Notably, the lead bit for each bit shifted piece of data is no longer at the first position of the particular first byte that stores the piece of data. Instead, due to the bit shift, the lead bit is shafted to the right within the particular first byte. Furthermore, the last byte for the shifted piece of data (which may be stored in the same number of bytes or in the number of bytes plus one additional byte) may have a different number of remainder bits. As used herein, the term remainder bits indicates bits of a last unfilled byte of data storing a shifted piece of data. The bit shifted pieces of data are then processed by CPU 503 and stored as packed data in CPU memory 504. To pack the shifted piece of data, CPU 503 performs a bitwise OR operation on the first byte of each piece of current data and the remainder bits (e.g., in the last unfilled byte) of the piece of prior data relative to the piece of current data. The bitwise OR operation provides a logical inclusive OR on the first byte of the piece of current data and the last byte of the piece of prior data such that, if the bit position of both is 0 the result is zero, while otherwise (e.g., if either has a value of 1 for the bit position), the result is one. Thereby, the bytes are merged and packed into a byte of the packed data with the lead bit of the piece of current data having remainder bits from the piece of prior data preceding it. CPU 503 further performs a copy operation for any bytes of the piece of current data following the first byte to copy such bytes immediately following the discussed merged byte. Such processing is continued through the second to last byte of the piece of current data and is then repeated for each bit shifted piece of data to provide packed serial data in CPU memory 504. Such packed serial data may then be processed by CPU 503 in any suitable context such as generation of a bitstream, etc.

Figure 6:
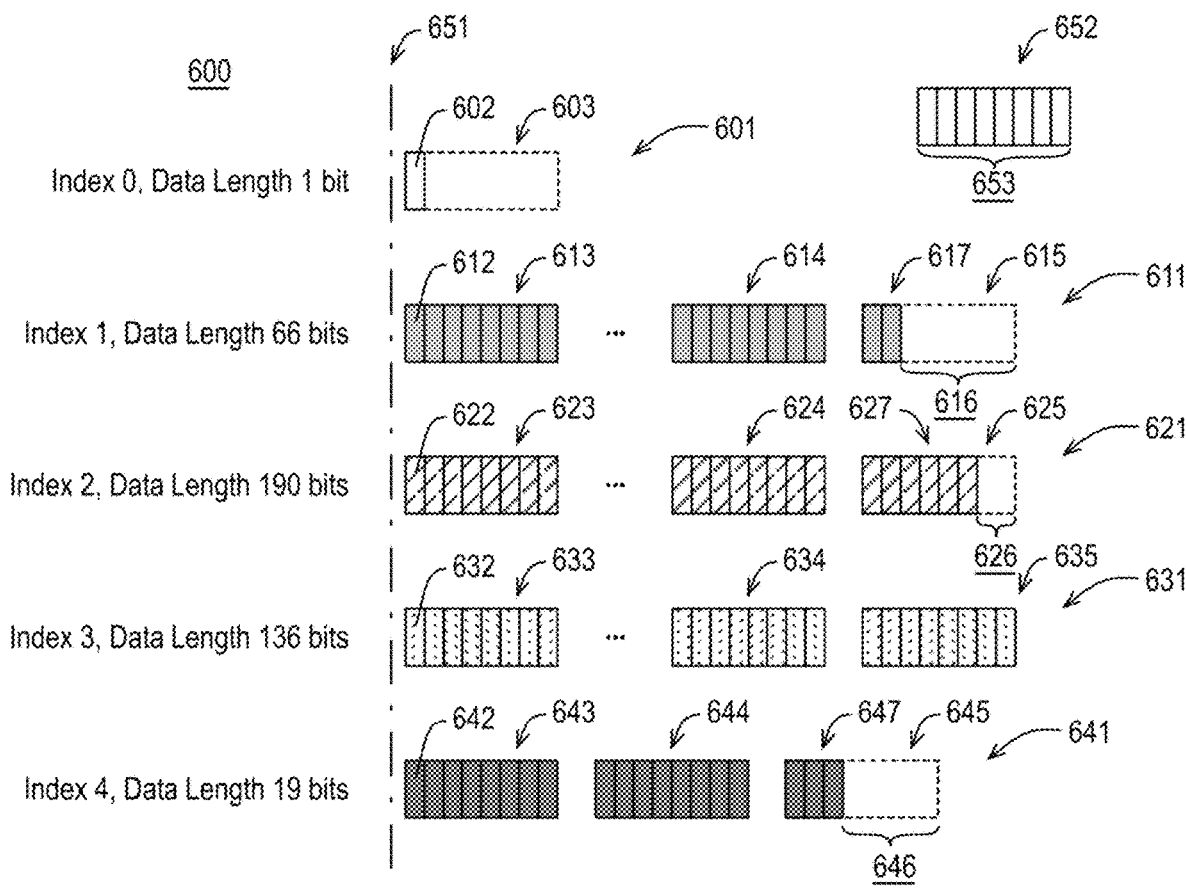
FIG. 6 is a diagram of exemplary pieces of data having variable lengths.

FIG. 6 is a diagram of exemplary pieces of data having variable lengths, arranged in accordance with at least some implementations of the present disclosure. Stored data structure 600 includes sequential pieces of data having variable bit lengths. As shown in FIG. 6, a stored data structure 600 including any number of pieces of data such as pieces of data 601, 611, 621, 631, 641 may be output and stored in shared memory such that stored data structure 600 is representative of a memory structure of stored data. Notably, stored data structure 600 includes, in the illustrated example, five pieces of data 601, 611, 621, 631, 641 having lengths of 1, 66, 190, 136, and 19 bits, respectively, but stored data structure 600 but may include any number of pieces of data of any sizes. As used herein, the term piece of data indicates a data structure having any number of bits indicative of output processing such that each piece of data is a continuous representation of a symbol, value, object, etc. For example, stored data structure 600 may be generated by GPU 501 and stored to shared memory 502. FIG. 6 further illustrates an exemplary byte 652 having eight bits 653. Furthermore, bits 653 are ordered in byte 652 (from left to right for example) such that a first bit of byte 652 is at the left boundary of byte 652, a second bit of byte 652 immediately follows to the right the first bit, a third bit of byte 652 immediately follows to the right the second bit, and so on through a final (eight) bit at the right boundary of byte 652. As used herein, the terms bit and byte may represent a memory storage location or locations and/or the data represented in such memory storage location or locations, depending on context. That is, a bit may be a memory location to store a bit or the bit of information stored in the memory. Similarly a byte may be eight memory locations to store bits of information or the data stored in the byte.

As shown, lead bit 602 of piece of data 601 (which only has one bit) is provided at a first position of a byte 603 and aligned with a byte boundary 651. Byte boundary 651 is representative and does not necessarily indicate a boundary in shared memory. However, byte boundary 651 is indicative that each of pieces of data 601, 611, 621, 631, 641 are aligned in that the lead bits of each are at a first byte position of their respective bytes. That is, lead bit 612 of piece of data 611 (which has 66 bits) is provided at a first position of a byte 613, lead bit 622 of piece of data 621 (which has 190 bits) is provided at a first position of a byte 623, lead bit 632 of piece of data 631 (which has 190 bits) is provided at a first position of a byte 633, lead bit 642 of piece of data 641 (which has 190 bits) is provided at a first position of a byte 643, and so on.

Furthermore, each piece of data 601, 611, 621, 631, 641 fills any number of subsequent bytes in full and then fills a final byte either partially or in full. For example, as shown piece of data 601 fills zero subsequent bytes and only partially fills byte 603 such that byte 603 includes lead bit 602 and empty bits (e.g., zeroes only) subsequent to lead bit 602. Piece of data 611 includes lead bit 612 in byte 613 at a first position thereof and then byte 613 is filled with seven subsequent bits of piece of data 611. Piece of data 611 then further includes seven additional filled bytes including byte 614 followed by an unfilled byte 615. As shown, byte 615 includes bits 617 (which may be characterized as remainder bits as they are after filled bytes) and a gap 616 of unfilled bits (e.g., zeroes only). As used herein, the term unfilled bit indicates a bit that has not been assigned a value and is therefore a zero (or null). Such unfilled bits having a value of zero are contrasted with filled bits that have a value of zero due to being assigned the zero as part of a continuous piece of data.

Furthermore, piece of data 621 includes lead bit 622 at a first bit position in byte 623 including seven subsequent bits of piece of data 621. Piece of data 621 then further includes twenty-two additional filled bytes including byte 624 followed by an unfilled byte 625. Unfilled byte 615 includes six bits 627 (e.g., remainder bits) and a gap 626 of unfilled bits (e.g., zeroes only). Similarly, byte 633 of piece of data 631 includes lead bit 632 followed immediately by seven bits, with byte 633 being followed by fifteen bytes filled bytes including byte 634, which is, in turn, followed by filled byte 635. Notably, piece of data 621 fully populates or fills seventeen bytes including byte 633, fifteen intervening bytes, byte 634, and byte 635. It is noted that byte 635 (as a filled byte) is illustrated for the sake of clarity of presentation. For example, after bit shift, bits of piece of data 621 from byte 635 may overflow into a subsequent byte (not shown). Finally, byte 643 of piece of data 641 includes lead bit 642 followed immediately by seven bits, with byte 643 being followed by filled byte 644, which is, in turn, followed by unfilled byte 645 having three bits 647 of piece of data 641 and a gap 646 of five bits.

Stored data structure 600 provides pieces of data 601, 611, 621, 631, 641 having particular characteristics for the sake of example and clarity of presentation. However, stored data structure 600 may have any number of pieces of data having any sizes such that each piece of data is stored with a lead bit at first bit position of a first byte, followed by bits of the piece of data filling (as provided by the number of bits in the piece of data) the remainder of the first byte, any number of filled bytes subsequent to the first byte, and a portion of an unfilled byte subsequent to the filled bytes (depending on the size of the piece of data). Generally, stored data structure 600 may contain N input pieces of data each having a particular bit length $L_0, L_1, L_2, \ldots, L_N$. As discussed, the N input pieces of data may be representative of any suitable variable length data. In some embodiments, N input pieces of data may be variable length coding output data. For example, the techniques discussed herein may be applied to packing variable length data in VLC applications such as image compression or video compression codecs.

As discussed, it is advantageous for serial CPU processing to process stored data structure 600 (as stored in shared memory 502) to packed data (stored to CPU memory 504). Discussion now turns to a packed data structure for use by a CPU.

Figure 7:
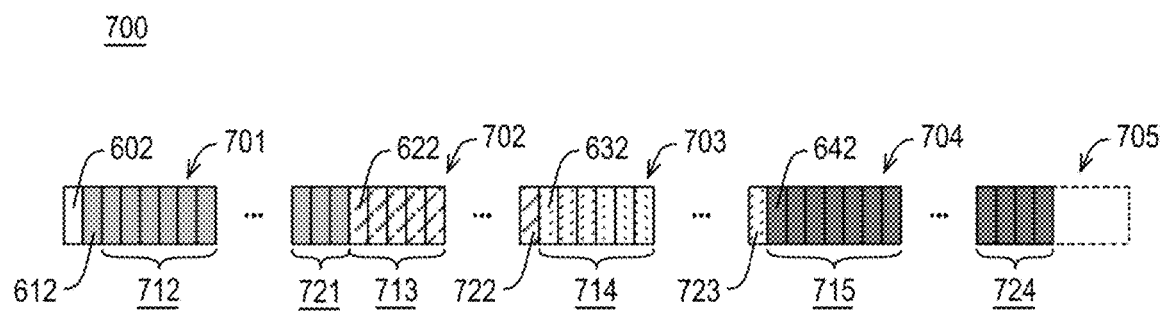
FIG. 7 is a diagram of an example packed variable length data structure generated from pieces of data having variable lengths.

FIG. 7 is a diagram of an example packed variable length data structure 700 generated from pieces of data having variable lengths, arranged in accordance with at least some implementations of the present disclosure. For example, packed variable length data structure 700 may be stored to CPU memory 504 for serial processing by CPU 503. As shown in FIG. 7, packed variable length data structure 700 may be stored into a number of bytes such as bytes 701, 702, 703, 704, 705 (and intervening bytes) such that each bit of each byte (possibly exclusive of a last byte 705) is fully populated or filled. Notably, each of pieces of data 601, 611, 621, 631, 641 are packed such that there are no intervening gaps therebetween. That is, each lead bit 612, 622, 632, 642 of pieces of data 611, 621, 631, 641 (exclusive of lead bit 602, which is the lead bit of packed variable length data structure 700) immediately follows a prior end bit of a piece of prior data.

That is, lead bit 602 is aligned with a first bit portion of byte 701 as it is the lead bit of packed variable length data structure 700. The remainder of piece of data 601 would then follow lead bit 602 (although in this example, piece of data 601 has no additional bits after lead bit 602). Then, lead bit 612 immediately follows piece of data 601 with no bit gaps (e.g., unassigned bits) therebetween. Therefore, packed variable length data structure 700 may be contrasted with stored data structure 600 as the gap in byte 603 has been eliminated in the data packing.

Lead bit 612 is then followed immediately by the remaining bits of piece of data 611 which fill a pertinent number of intervening filled bytes (in this case 7 bytes) through a portion of byte 702 such that, again, there are no bit gaps therein. Therefore, byte 701 includes a portion 712 of piece of data 611. Byte 702 then includes, at the beginning thereof, remainder bits 721 that overflow the last filled byte of the intervening bytes. Notably, remainder bits 721 are post shift remainder bits as discussed further herein (and include but do not match the size of remainder bits 617). As shown lead bit 622 of piece of data 621 then immediately follows the last of post shift remainder bits 721 and subsequent bits of piece of data 621 then immediately follow lead bit 622 such that byte 702 includes remainder bits 721 and a portion 713 of piece of data 621.

As with piece of data 611, piece of data 621 then fills a pertinent number of intervening filled bytes between bytes 702, 703 (in this case 23 bytes) through a portion of byte 703 such that there are no bit gaps therein. Byte 703 then includes, at the beginning thereof, remainder bit 722 that overflow the last filled byte of the intervening bytes. As with remainder bits 721, remainder bit 722 is a post shift remainder bit after piece of data 621 is shifted as discussed herein. Lead bit 632 of piece of data 631 then immediately follows remainder bit 722 and subsequent bits of piece of data 631 then immediately follow lead bit 632 such that byte 703 includes remainder bit 722 and a portion 714 of piece of data 631.

Similarly, piece of data 631 then fills a pertinent number of intervening filled bytes between bytes 703, 704 (in this case 16 bytes) through a portion of byte 704. Byte 704 includes, at the beginning thereof, remainder bit 723 that overflow the last filled byte of the intervening bytes such that remainder bit 723 is a post shift remainder bit after piece of data 631 is bit shifted. Lead bit 642 of piece of data 641 then immediately follows remainder bit 723 and subsequent bits of piece of data 641 then immediately follow lead bit 642 such that byte 704 includes remainder bit 723 and a portion 715 of piece of data 641. Finally, piece of data 641 then fills a pertinent number of intervening filled bytes between bytes 704, 705 (in this case one byte) such that byte 705 includes, at the beginning thereof, remainder bits 724 that overflow the last filled byte of the intervening bytes. As with previous remainder bits, remainder bits 724 are post shift remainder bits after piece of data 641 is bit shifted based on a bit shift value.

As discussed, packed variable length data structure 700 may be stored to CPU accessible memory such as CPU memory 504 for processing by CPU 503. Such packed variable length data structure 700 may be advantageously packed with respect to stored data structure 600 such that it is absent gaps of unassigned bit values. In some embodiments, packed variable length data structure 700 is stored to CPU memory 504 such that each byte of packed variable length data structure 700 is at a consecutive byte of CPU memory 504. For example, each first bit of each byte of packed variable length data structure 700 may be at one of a consecutive number of assigned memory locations of CPU memory 504.

In some embodiments, the packing of stored data structure 600 to generate packed variable length data structure 700 includes attaining sequential pieces of data 601, 611, 621, 631, 641 having variable bit lengths for packing such that each piece of data has one or more bits including lead bits 602, 612, 622, 632, 642, determining bit shift values for pieces of data 601, 611, 621, 631, 641 such that the bit shift values indicate a bit shift for each piece of current data to pack post-shift remainder bits from a piece of prior data before the lead bit of the piece of current data, executing, in parallel with individual ones multiple execution units of a GPU, bit shift operations for each piece of current data having a bit shift value, and providing, via a CPU, packed variable length data structure 700 such that bytes 702, 703, 704 include one or more post-shift remainder bits 721, 722, 723 from pieces of prior data 611, 621, 631 packed with lead bits 622, 632, 642 of pieces of current data 621, 631, 641 into CPU accessible memory such as CPU memory 504.

For example, byte 702 includes post shift remainder bits 721 from piece of data 611 (e.g., a piece of prior data) packed with lead bit 622 of piece of data 621 (e.g., a piece of current data). Similarly, byte 703 includes post shift remainder bit 722 from piece of data 621 (e.g., a piece of prior data) packed with lead bit 632 of piece of data 631 (e.g., a piece of current data) and byte 704 includes post shift remainder bit 723 from piece of data 631 (e.g., a piece of prior data) packed with lead bit 642 of piece of data 641 (e.g., a piece of current data). Such patterning may run through intermittent ones of bytes of packed variable length data structure 700. Discussion now turns to efficient and parallel processing generation of packed variable length data structure 700 from stored data structure 600.

In some embodiments, a bit shift value is generated for each of pieces of data 601, 611, 621, 631, 641 of stored data structure 600. For example, CPU 503 may access pieces of data 601, 611, 621, 631, 641 or the sizes thereof and generate a bit shift value for each such that the bit shift value is representative of a right bit shift to be applied to each of pieces of data 601, 611, 621, 631, 641 to generate packed variable length data structure 700 from stored data structure 600. Notably, each bit shift value may be generated such that, after bit shift, the lead or first byte of each byte of shifted piece of current data may be combined with remainder bits from a shifted piece of prior data to generate a byte having the remainder bits of a piece of prior data followed immediately by the lead bit of a piece of current data as discussed with respect to bytes 702, 703, 704. That is, each piece of current data may be right bit shifted to make room for remainder bits from each piece of prior data. Such bit shift values may be generated using any suitable technique or techniques.

Figure 8:
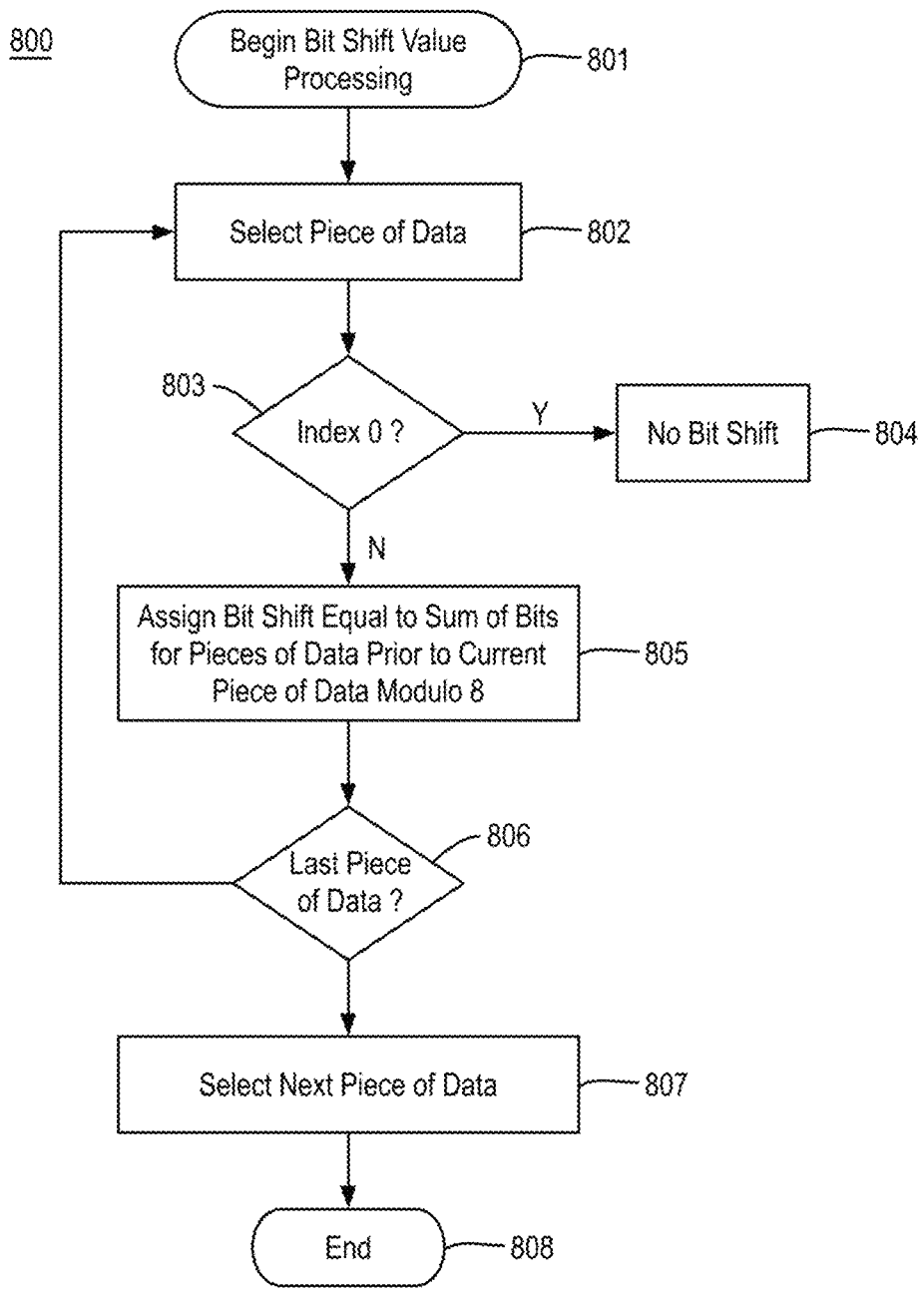
FIG. 8 is a flow diagram illustrating an example process for determining a bit shift value for each piece of data of a stored data structure or pieces of data set.

FIG. 8 is a flow diagram illustrating an example process 800 for determining a bit shift value for each piece of data of a stored data structure or pieces of data set, arranged in accordance with at least some implementations of the present disclosure. Process 800 may include one or more operations 801-808 as illustrated in FIG. 8. Process 800 or portions thereof may be performed by a device or system (e.g., CPU 503) to determine a bit shift value for each piece of data of a stored data structure or pieces of data set. Process 800 or portions thereof may be repeated for any number of stored data structures or pieces of data sets or the like. In some embodiments, process 800 may be implemented for stored data structure 600.

As shown, process 800 begins at operation 801, where bit shift value generation processing begins. For example, process 800 may initiate in response to a call to pack a variable length data structure for serial processing. Processing continues at operation 802, where a piece of data of the variable length data structure is selected. For example, each sequential piece of data may be selected in turn for processing. Processing continues at operation 803, where a determination of whether the piece of data selected at operation 802 is a first piece of data in the data structure (e.g., an index of 0). If so, processing continues at operation 804, where no bit shift value or a bit shift value of zero or a null value is assigned to the piece of data. Notably, the first piece of data in the data structure is not bit shifted as the lead bit is at a first bit position of the byte in the data structure and the same first bit position for the lead bit is desired in the resultant packed data structure.

If not, processing continues at operation 805, where a bit shift value is assigned to the piece of data as follows. First, the total data size of the data structure up to but excluding the current piece of data selected at operation 802 is determined. For example, for the second piece of data, the total prior data size is the size of the first piece of data. For the third piece of data, the total prior data size is a sum of the size of first piece of data and the size of second piece of data. For the fourth piece of data, the total prior data size is a sum of the sizes of first, second, and third pieces of data, and so on. Then, the total prior data size is divided by the byte size in bits (e.g., divided by eight for a byte size of eight bits) and the remainder (if any) is the bit shift value for the current piece of data selected at operation 802. Such processing as provided by operations 803-805 may be summarized in Equation (1):

$$S_0=0, S_i=[\Sigma_{j=0}^{i-1} Lj]\%8| \quad (1)$$

where $S_0$ is the bit shift for the first piece of data (e.g., index 0), $S_i$ is the bit shift for each subsequent piece of data (e.g., indices 1–N), j is a counter variable, $L_j$ is the length of the $j^{th}$ piece of data, % provides the modulo operator (providing a remainder value), and 8 is the byte size. Continuing the example of FIG. 6, $L_0=0$ (first piece of data in stored data structure 600, index 0), $L_1=1$ ((1)%8), $L_2=3$ ((1+66)%8), $L_3=1$ ((1+66+190)%8), and $L_4=1$ ((1+66+190+136)%8). That is, index 0 does not need a right bit shift, index 1 needs a 1 bit right bit shift (>>1), index 2 needs a 3 bit right bit shift (>>3), index 3 needs a 1 bit right bit shift (>>1), and index 4 needs a 1 bit right bit shift (>>1).

Processing continues at operation 806, where a determination is made as to whether the last piece of data has processed. If not, processing continues at operation 802 as discussed above. If so, processing ends at end operation 808, where the resultant bit shift value for each piece of data is output for use in subsequent processing.

After attaining, via CPU 503 for example, the bit shift values for each piece of data, GPU 501 attains the pieces of data in parallel and processes a bit shift operation for each piece of data separately and in parallel using one of EUs 505A-N for one of (e.g., in 1.1 manner) the pieces of data. Such bit shifting in parallel advantageously provides decreased processing time and increased throughput. In some embodiments, only those pieces of data having a bit shift value are pulled from shared memory 502, bit shifted by GPU 501, and returned to shared memory 502. For example, processing may be skipped for those pieces of data having a bit shift value of zero (including the first piece of data) to save on memory transfer times, etc. After bit shift, post bit shift pieces of data are returned to shared memory 502. Such post bits shift pieces of data may also be referred to as pieces of data as they include the same data albeit shifted in the memory.

Figure 9:
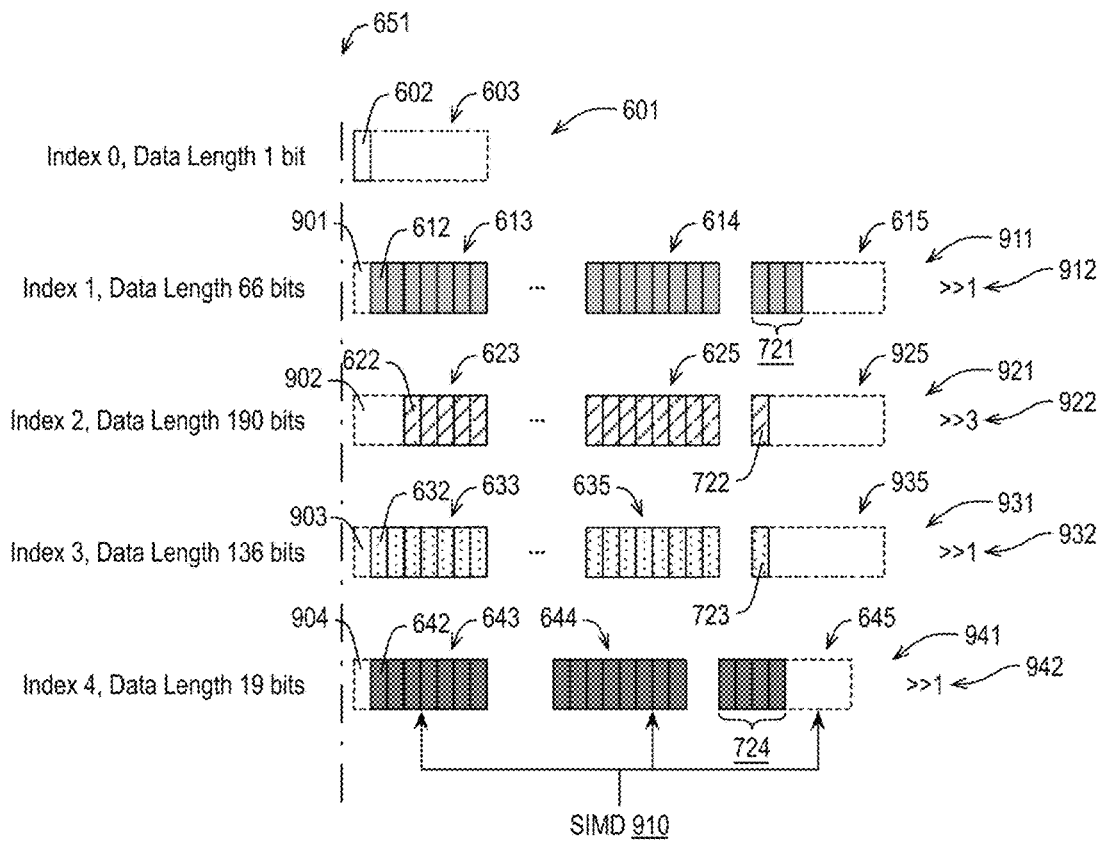
FIG. 9 is a diagram of exemplary post bit shift pieces of data generated as part of packing variable length data.

FIG. 9 is a diagram of exemplary post bit shift pieces of data generated as part of packing variable length data, arranged in accordance with at least some implementations of the present disclosure. In some embodiments, GPU 501 attains stored data structure 600 from shared memory 502, performs parallel bit shift operations on those pieces of data having a corresponding bit shift value, and stores the resultant post bit shift stored data structure 900 back to shared memory 502 such that CPU 503 may access post bit shift stored data structure 900, generate packed variable length data structure 700, and store packed variable length data structure 700 to CPU memory 504 for serial processing. In some embodiments, the parallel bit shift operations are performed by GPU 501 using a single instruction, multiple data (SIMD) instruction for each of the individual ones of EUs 505A-N as shown with respect to SIMD instructions 910.

As shown in FIG. 9, a post bit shift stored data structure 900 includes shifted pieces of data 911, 921, 931, 941 shifted from pieces of data 611, 621, 631, 641 (please refer to FIG. 6) to. Notably, shifted pieces of data 911, 921, 931, 941 have the same bit sizes as pieces of data 611, 621, 631, 641 but shifted pieces of data 911, 921, 931, 941 have been right bit shifted according to the bit shift values generated using process 800, which are illustrated as bit shift values 912, 922, 932, 942 for shifted pieces of data 911, 921, 931, 941, respectively. As shown, piece of data 601 is not bit shifted as it is the first piece of data (index 0). As used herein, the term shifted piece of data indicates a piece of data (as defined above) that has a lead bit that is not aligned with a first bit position of a byte in which the lead bit is stored. For example, a piece of data (unshifted) has a lead bit at the first position of a byte while a shifted piece of data has a lead bit at the position of one plus the bit shift value of the byte. A shifted piece of data shifted by one has a lead bit at the second position of a byte, a shifted piece of data shifted by two has a lead bit at the third position of a byte, and so on.

As discussed, piece of data 601 is not bit shifted and therefore lead bit 602 is at the first position of byte 603. In contrast, shifted piece of data 911 has lead bit 612 thereof at a second bit position of byte 613 and byte 613 has a gap 901 of 1 bit preceding lead bit 612. Furthermore, shifted piece of data 911 has a number of bits immediately following lead bit 612 packed into byte 613, packed into intervening bytes, packed into byte 614, and packed into a first portion of byte 615 such that remainder bits 721 are provided at the first three positions of byte 615. It is noted that although illustrated with respect to the same byte labels as illustrated in FIG. 6 for the sake of clarity of illustration, shifted pieces of data 911, 921, 931, 941 (nor piece of data 601) need not be stored in the same memory locations after bit shifting. Instead, shifted pieces of data 911, 921, 931, 941 need only be stored with their lead bits 612, 622, 632, 642 provided in the illustrated bit locations within particular bytes and optionally packed in sequential memory locations.

As shown with respect to bytes 603, 613, the bit shift of piece of data 611 to shifted piece of data 911 provides bytes that have assigned bits (including lead bit 602, lead bit 612, and the bits of byte 613 subsequent to lead bit 612) that fill a byte. Similarly, the gaps of bytes 603, 613 are aligned such that during bitwise OR operations on bytes 603, 613, data is not lost.

Furthermore, shifted piece of data 921 (shifted according to bit shift value 922) has lead bit 622 thereof at a fourth bit position of byte 623 and byte 623 has a gap 902 of 3 bits preceding lead bit 622. Shifted piece of data 921 has a number of bits immediately following lead bit 622 packed into byte 623, intervening bytes (including byte 624, please refer to FIG. 6), byte 625, and packed into a first bit position of a byte 925 such that remainder bits 722 is provided in the first bit position of newly used byte 925. Referring now to bytes 615, 623, the bit shift of piece of data 621 to shifted piece of data 921 provides bytes that have assigned bits (including remainder bits 721, lead bit 622, and the bits of byte 623 subsequent to lead bit 622) that fill a byte.

Similarly, after bit shift according to bit shift value 932, shifted piece of data 931 has lead bit 632 at a second bit position of byte 633 and byte 633 has a one bit gap 903 preceding lead bit 632. Shifted piece of data 931 then has a number of bits immediately following lead bit 632 packed into byte 633, intervening bytes (including byte 634, please refer to FIG. 6), byte 635, and packed into a first bit position of a byte 935 such that remainder bits 723 is provided in the first bit position of newly used byte 935. Bytes 925, 633, after bit shift, have bytes that have assigned bits (including remainder bit 727, lead bit 632, and the bits of byte 633 subsequent to lead bit 632) that, together, fill a byte. Finally, shifted piece of data 941 (shifted according to bit shift value 942) has lead bit 642 at a second bit position of byte 643 and byte 643 has a gap 904 of 1 bit preceding lead bit 642. Shifted piece of data 941 has a number of bits immediately following lead bit 642 packed into byte 643, packed into byte 624, and packed into the first four bit positions of a byte 645. Referring now to bytes 935, 643, the discussed bit shifts provide bytes 935, 643 that have assigned bits (including remainder bit 723, lead bit 642, and the bits of byte 643 subsequent to lead bit 642) that fill a byte. It is noted that such processing may continue for any number of pieces of data. In the context of FIG. 9, remainder bits 724 are the last bits of eventual packed variable length data and the corresponding byte containing remainder bits 724 will include a gap thereafter.

As discussed, post bit shift stored data structure 900 may be stored by GPU 501 to shared memory 502. Post bit shift stored data structure 900 is prepared to be packed into a packed variable length data structure and stored, for example, in CPU memory 504. As used herein, the term packed variable length data or packed variable length data structure indicates data stored in memory such that a lead bit of the packed variable length data is at a first bit position of a byte and the subsequent bits of the packed variable length data are packed, without gap, continuously into subsequent contiguous bytes of the memory (either physical or virtual) within a memory address space. For example, each byte used by the packed variable length data may include a series of ordered memory address without intervening data between such memory addresses.

Figure 10:
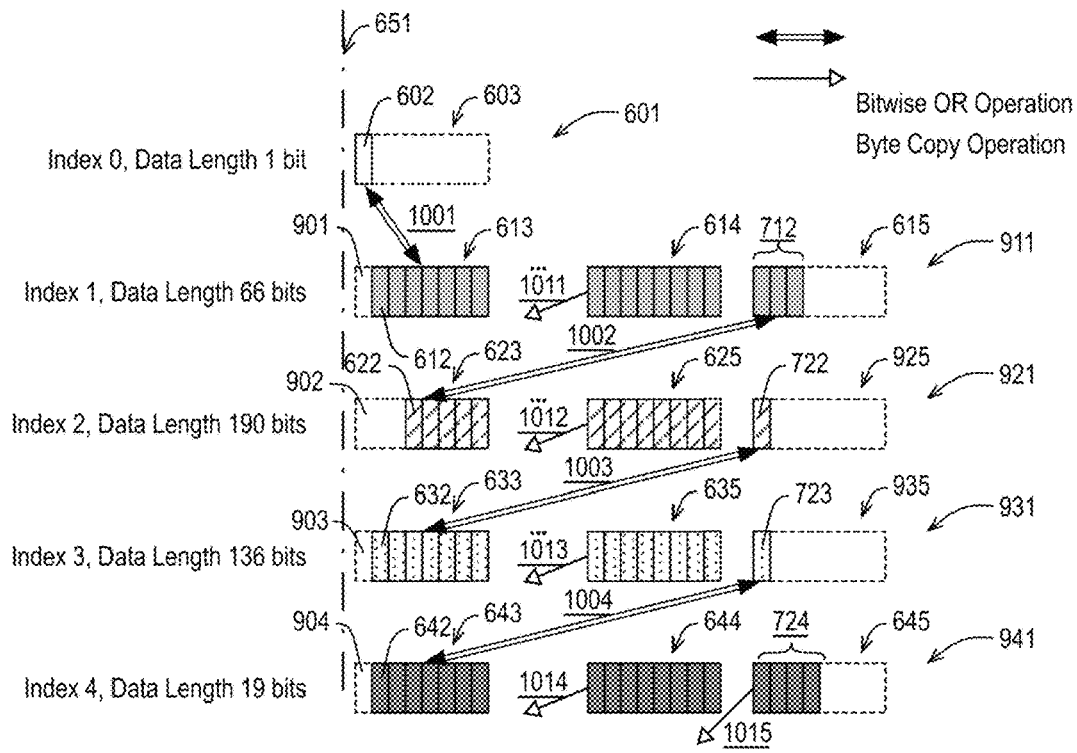
FIG. 10 is a diagram of exemplary bitwise OR operations and byte copy operations to generate a packed variable length data structure from a post bit shift stored data structure.

FIG. 10 is a diagram of exemplary bitwise OR operations and byte copy operations to generate a packed variable length data structure from a post bit shift stored data structure, arranged in accordance with at least some implementations of the present disclosure. In some embodiments, CPU 503 attains post bit shift stored data structure 900 from shared memory 502, performs bitwise OR operations and byte copy operations as discussed below, and stores resultant packed variable length data structure 700 to CPU memory 504 such that CPU 503 may subsequently perform parallel processing on packed variable length data structure 700.

As shown in FIG. 10 and with reference to FIG. 7, CPU 503 applies a bitwise OR operation 1001 based on the data in bytes 603, 613 to generate the data in byte 701. As discussed, a bitwise OR operation applies an OR operation between the bit values in each of the bit positions of bytes 603, 613. That is, an OR operation is applied between the bit value in the first position of byte 603 and the bit value in the first position of byte 613, an OR operation is applied between the bit value in the second position of byte 603 and the bit value in the second position of byte 613, an OR operation is applied between the bit value in the third position of byte 603 and the bit value in the third position of byte 613, and so on. Such that the gaps of bytes 603, 613 are filled with the pertinent data of the other byte. Thereby, packed byte 701 is generated having lead bit 602 followed immediately lead bit 612 and remaining bits of shifted piece of data 911 in byte 613.

CPU 503 further applies a number of copy operations based on shifted piece of data 911 to copy bytes between byte 613 and 615 (e.g., those bytes that are filled and without any gaps), as illustrated by copy operation 1011, into resultant packed variable length data structure 700. With reference to FIG. 7, such copied bytes (including byte 614) are stored between and immediately adjacent to bytes 701, 702 (e g, immediately to the right of byte 701 and immediately to the left of byte 702). Such intervening bytes stored by copy operations such as copy operation 1011 are not shown for the sake of clarity of presentation.

Returning to FIG. 10 and with continued reference to FIG. 7, CPU 503 applies a bitwise OR operation 1002 based on the data in byte 615 (e.g., the last and unfilled byte of shifted piece of data 911) and the data in byte 623 (e.g., the first and unfilled byte of shifted piece of data 921) to generate the data in byte 702. Byte 702 is packed after the bytes from the copy operations that copy the bytes between byte 613 and byte 615. Thereby, packed byte 702 is generated having remainder bits 721 followed immediately by lead bit 622 of shifted piece of data 921, which is followed immediately by additional data from shifted piece of data 921 in a sequential manner CPU 503 also applies a number of copy operations based on shifted piece of data 921 to copy filled and gapless bytes between bytes 623 and 925 as illustrated by copy operation 1012, into packed variable length data structure 700. With reference to FIG. 7, such copied bytes (including byte 625) are stored between and immediately adjacent to bytes 702, 703.

Similarly, CPU 503 applies a bitwise OR operation 1003 based on the data in byte 925 (e.g., the last and unfilled byte of shifted piece of data 921) and the data in byte 633 (e.g., the first and unfilled byte of shifted piece of data 931) to generate the data in byte 703. Byte 703 is packed after the bytes from the copy operations that copy the bytes between byte 623 and byte 925 discussed above. Thereby, packed byte 703 is generated having remainder bit 722 followed immediately by lead bit 632 of shifted piece of data 931, which is followed immediately by additional data from shifted piece of data 931 in a sequential manner CPU 503 also applies a number of copy operations based on shifted piece of data 931 to copy filled and gapless bytes between bytes 633 and 935 as illustrated by copy operation 1013, into packed variable length data structure 700 such that the copied bytes (including byte 635) are stored between and immediately adjacent to bytes 703, 704.

Finally, CPU 503 applies a bitwise OR operation 1004 based on the data in byte 935 (e.g., the last and unfilled byte of shifted piece of data 931) and the data in byte 643 (e.g., the first and unfilled byte of shifted piece of data 941) to generate the data in byte 704. Byte 704 is packed after the bytes from the copy operations that copy the bytes between byte 633 and byte 935 (including byte 635) discussed above. Thereby, packed byte 704 is generated having remainder bit 723 followed immediately by lead bit 642 of shifted piece of data 941, which is followed immediately by additional data from shifted piece of data 941 in a sequential manner CPU 503 also applies copy operations based on shifted piece of data 941 to copy filled and gapless bytes (as illustrated by copy operation 1014) as well as final unfilled byte 645 (as shifted piece of data 941 is the last piece of data to be packed) as illustrated by copy operation 1015. As shown in FIG. 7, such copied byes are packed into packed variable length data structure 700 subsequent to byte 715 through byte 724. Thereby, a serial, ordered, and packed variable length data structure 700 is stored to CPU memory 504 for use in serial processing by CPU 503.

Figure 11:
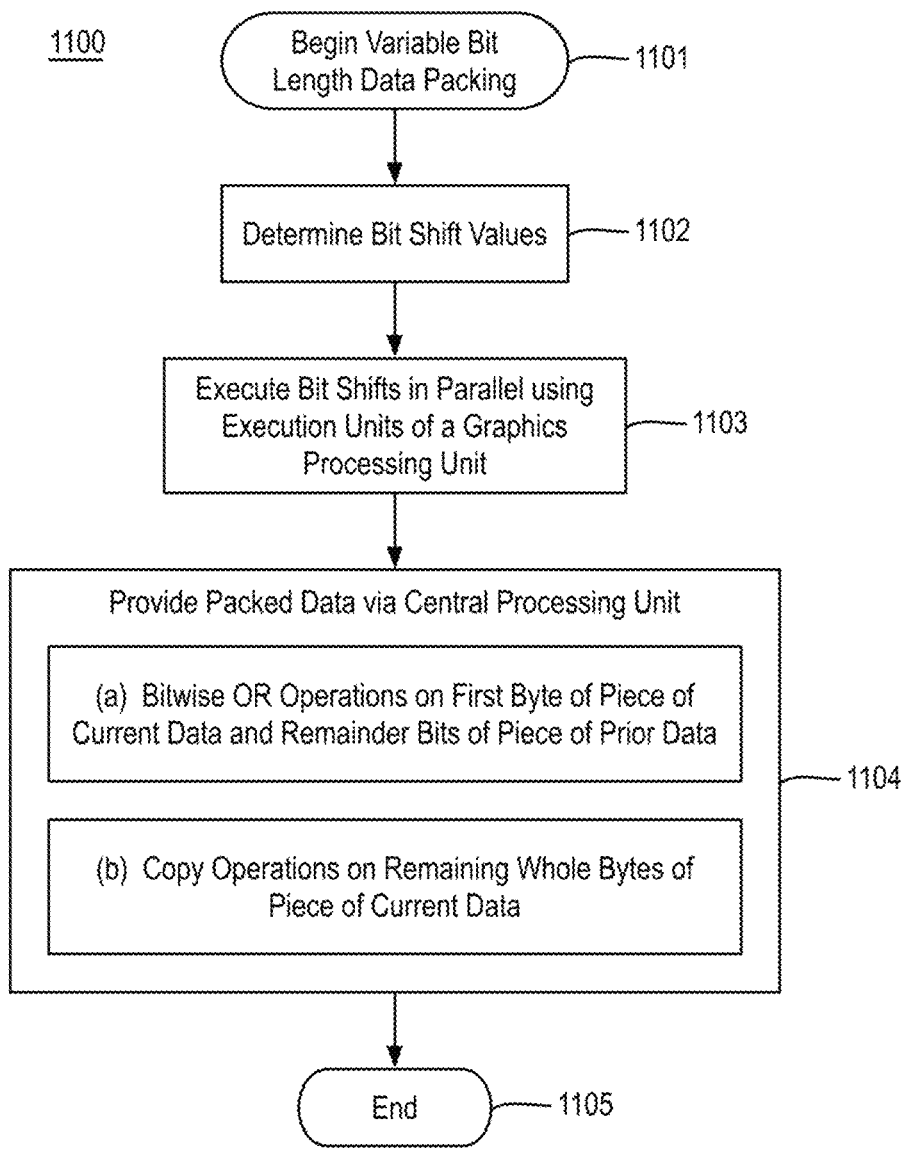
FIG. 11 is a flow diagram illustrating an example process for packing a stored data structure of sequential pieces of data having variable bit lengths into a packed variable length data structure.

FIG. 11 is a flow diagram illustrating an example process 1100 for packing a stored data structure of sequential pieces of data having variable bit lengths into a packed variable length data structure, arranged in accordance with at least some implementations of the present disclosure. Process 1100 may include one or more operations 1101-1105 as illustrated in FIG. 11. Process 1100 or portions thereof may be performed by a device or system (e.g., system 500) to pack sequential pieces of data having variable bit lengths into a packed variable length data structure of a series of bytes. Process 1100 or portions thereof may be repeated for any number of sets of sequential pieces of data or the like. In some embodiments, process 1100 may be implemented for stored data structure 600.

As shown, process 1100 begins at start operation 1101, where variable bit length data packing processing begins. For example, any number of sequential pieces of data having variable bit lengths may be attained. In some embodiments, a number of sequential pieces of data (e.g., 12 pieces of data) are selected and batched for processing. For example, as discussed further herein below with respect to FIG. 12, in some embodiments, a number of sequential pieces of data may be segmented into sets of sequential pieces of data each having the same number of pieces of data as an available number EUs of a GPU (e.g., 12 pieces of data). Each batch may then be processed as discussed with respect to process 1100. Furthermore, in such contexts at least some operations may be further parallelized. For example, GPU bit shift processing may be performed in parallel with CPU bitwise OR processing and copy operation processing. Notably, process 1100 may be applied to a batched set of sequential pieces of data having variable bit lengths.

Processing continues at operation 1102, where a bit shift value is determined for each piece of data in the sequential pieces of data having variable bit lengths. The bit shift value for each piece of data may be generated using any suitable technique or techniques such as those discussed with respect to FIG. 8.

Processing continues at operation 1103, where the bit shifts are executed in parallel using EUs of a GPU such that each piece of data is assigned to a separate EU for processing. Notably, bit shifting for all bytes is a repetitive task that may advantageously be performed in parallel by EUs of a GPU. In some embodiments, the GPU uses multiple EUs to shift multiple pieces of data in parallel. In an embodiment, in each EU (or core), the GPU shifts bytes data via SIMD instructions. For example, operation 1103 may provide post bit shift stored data structure 900 to shared memory based on processing stored data structure 600 as retrieved from the shared memory.

Processing continues at operation 1104, where a CPU generates a packed variable length data structure using the bit shifted pieces of data. For example, after the GPU bit shifts those pieces of data having a non-zero bit shift value, the CPU retrieves the bit shifted pieces of data and syncs and sequentially packs the bit shifted pieces of data to CPU accessible memory such that packed variable length data is stored. As shown in FIG. 11, operation 1104 may include sub operations 1101(a) and 1101(b). At sub operation 1101(a), the CPU performs bitwise OR operations first bytes of pieces of current data and remainder bits of pieces of prior data (e.g., using a last bit of pieces of prior data) to generate particular bytes of the packed variable length data structure that include lead bits of the pieces of current data. At sub operation 1101(b), the CPU performs byte copy operations on remaining whole bytes of pieces of current data and packs those bytes after the merged byte generated using the bitwise OR operation. For example, for each piece of current data after the first piece of data, a bitwise OR operation is applied to the first byte of the piece of current data (to merge the first byte of the piece of current data and the last byte of the piece of prior data having remainder bits) and other bytes of the piece of current data up to an unfilled byte of the piece of current data (if any) can be packed to the packed variable length data structure by memory copy operation.

Processing continues at end operation 1105, where the packed variable length data structure may be provided or used in subsequent processing. For example, the packed variable length data structure may be processed in serial by the CPU. In some embodiments, the packed variable length data structure is processed in serial by the CPU to generate a bitstream such as a codec compliant bitstream.

As discussed, in some embodiments, the processing of batches of sequential pieces of data may be further parallelized. For example, a first sequential pieces of data set or batch having a particular number of pieces of data (e.g., 12 pieces) and a second sequential pieces of data set or batch having the particular number of pieces of data may be provided. Although discussed with sequential pieces of data sets or batches having the same number of pieces of data, the number of pieces of data may differ in some embodiments. In such contexts, bit shifting (via operation 1103) may first be performed by the GPU on the first sequential pieces of data set or batch. Then, providing the packed data via the CPU (via bitwise OR operations and copy operations as discussed with respect to operation 1104) for the first sequential pieces of data set or batch (e.g., using shifted pieces of data) may be performed in parallel with bit shifting (via operation 1103), by the GPU, the second sequential pieces of data set or batch. Such parallel processing may be continued by providing the packed data via the CPU for the second sequential pieces of data set or batch while a third sequential pieces of data set or batch is bit shifted by the GPU, and so on.

Figure 12:
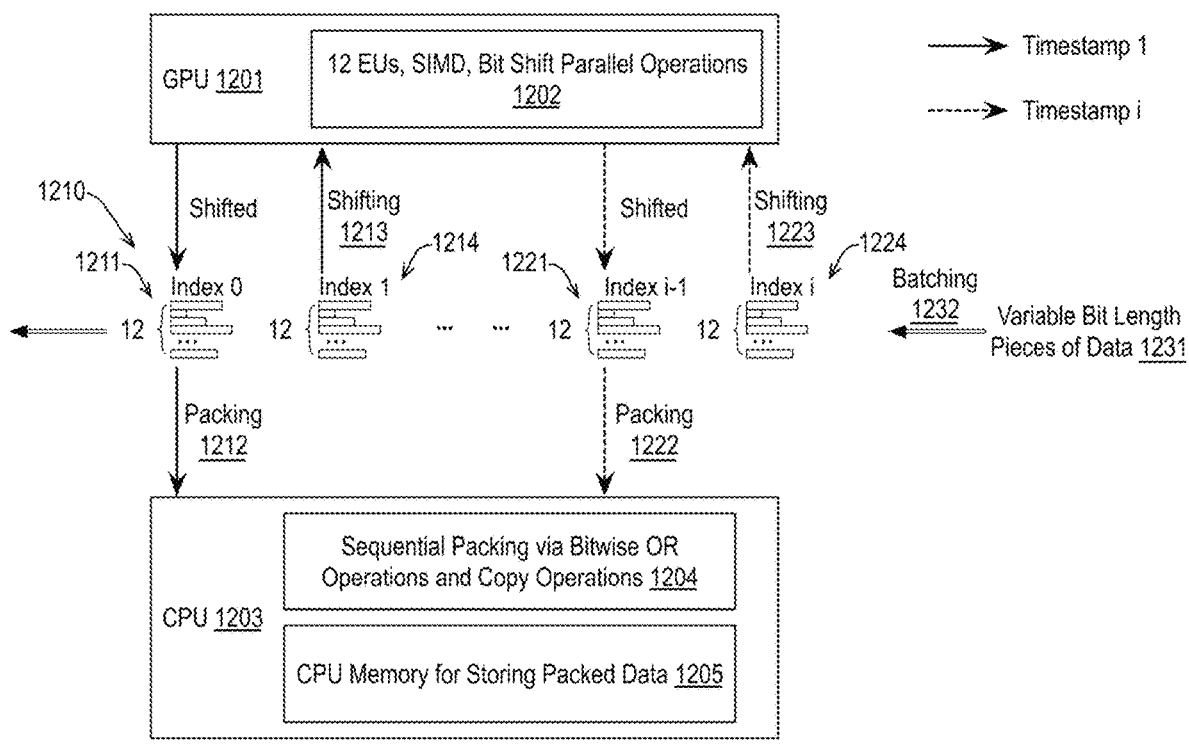
FIG. 12 is a diagram of exemplary parallel packing of multiple separate sets or batches of pieces of data.

FIG. 12 is a diagram of exemplary parallel packing of multiple separate sets or batches of pieces of data, arranged in accordance with at least some implementations of the present disclosure. As shown in FIG. 12, a GPU 1201 may include, for example, 12 EUs that may be controlled via SIMD instructions to perform bit shifts in parallel, for example, 12 pieces of data at a time, as illustrated with respect to collective GPU module 1202. Furthermore, a CPU 1203 may include circuitry to perform sequential packing via bitwise OR operations and copy operations, as illustrated with respect to collective CPU module 1204, and a CPU accessible memory 1205 for storing packed variable length data.

Furthermore, as shown with respect to batching operation 1232 a number N of variable bit length pieces of data 1231 may be divided into i+1 batches of pieces of data 1210, which are indexed as batches 0 to i. Variable bit length pieces of data 1231 may be batched using any suitable technique or techniques. In the illustrated example, variable bit length pieces of data 1231 are batched such that each batch includes 12 pieces of data (e.g., a constant number of pieces of data) to match the 12 EUs available for processing via GPU 12. However, variable bit length pieces of data 1231 may be batched using any suitable technique or techniques and, in some embodiments, are received pre-batched. In some embodiments, batching operation 1232 is performed by CPU 1203.

As shown, batches of pieces of data 1210 may be processed at least partially in parallel such that a first batch is being bit shifted by GPU 1201 while a second batch is being packed (e.g., using bitwise OR operations and copy operations) by CPU 1203 (such that the second batch was previously bit shifted by GPU 1201). For example, as shown, during a first time frame or at a first time stamp (as illustrated by solid lined arrows), a batch of pieces of data 1211 (index 0) is transferred for packing (e.g., transferred from shared memory, not shown, for packing by CPU 1203), as illustrated via packing memory transfer 1212. During the same first time frame or at the same first time stamp, another batch of pieces of data 1214 is transferred for bit shifting (e.g., transferred from shared memory for bit shifting by GPU 1201), as illustrated via bit shifting memory transfer 1213.

Notably, batch of pieces of data 1211 has been bit shifted and is prepared for packing and such packing by CPU 1203 and bit shifting of another batch of pieces of data 1214 may be performed concurrently. After such processing, packed variable length data corresponding to batch of pieces of data 1211 is stored to CPU memory 1205 for subsequent processing and post bit shift data corresponding to batch of pieces of data 1214 is stored to shared memory. The post bit shift data corresponding to batch of pieces of data 1214 is then transferred to CPU 1203 for packing and a third batch of pieces of data (not shown, index 2) may be transferred to GPU 1201 for concurrent bit shifting, and so on such that parallel processing is achieved. For example, as shown, during a later time frame or at a later time stamp i (as illustrated by dashed arrows), a batch of pieces of data 1221 (index i−1) is transferred from shared memory for packing by CPU 1203, as illustrated via packing memory transfer 1222. During the same time frame or at the same first time i, another batch of pieces of data 1224 is transferred from the shared memory for bit shifting by GPU 1201 as illustrated via bit shifting memory transfer 1223. Such bit shifting by GPU 1201 and packing by CPU 1203 are performed in parallel and, as discussed above, the resultant packed variable length data corresponding to batch of pieces of data 1221 is stored to CPU memory 1205 and the bit shifted data corresponding to batch of pieces of data 1224 is transferred to the shared memory and then to CPU 1203 for packing.

Figure 13:
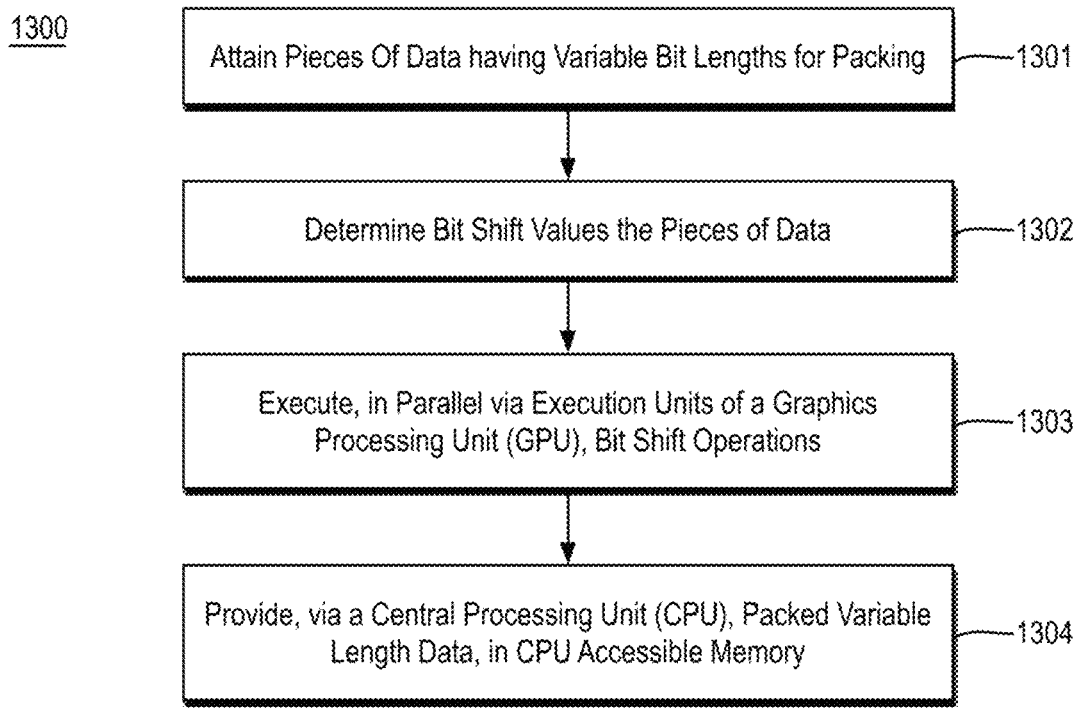
FIG. 13 is a flow diagram illustrating an example process for packing variable length data to serial packed data.

FIG. 13 is a flow diagram illustrating an example process 1300 for packing variable length data to serial packed data, arranged in accordance with at least some implementations of the present disclosure. Process 1300 may include one or more operations 1301-1304 as illustrated in FIG. 13. Process 1300 may form at least part of a data packing process. By way of non-limiting example, process 1300 may form at least part of a data packing process as performed by any device or system as discussed herein such as a CPU and GPU system. Furthermore, process 1300 will be described herein with reference to system 1400 of FIG. 14.

Figure 14:
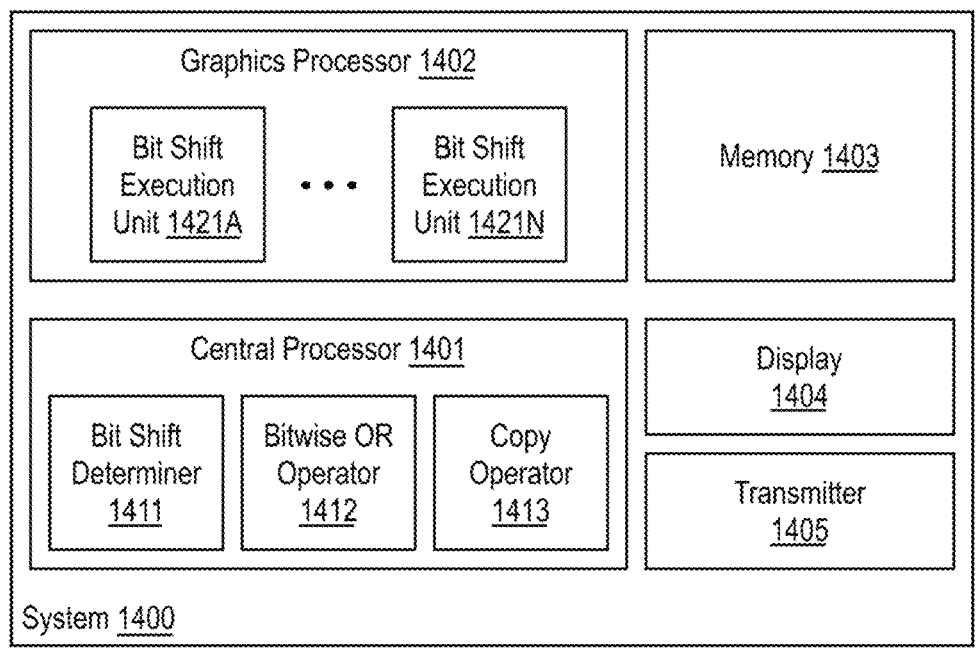
FIG. 14 is an illustrative diagram of an example system for packing variable length data to serial packed data.

FIG. 14 is an illustrative diagram of an example system 1400 for packing variable length data to serial packed data, arranged in accordance with at least some implementations of the present disclosure. As shown in FIG. 14, system 1400 includes a central processor 1401 (CPU), a graphics processor 1402 (GPU), memory 1403 (shared memory), a display 1404, and a transmitter 1405. Also as shown, central processor 1401 may include or implement bit shift determiner 1411, bitwise OR operator 1412, and copy operator 1413 while graphics processor 1402 may include or implement any number of bit shift execution units 1421A-N to perform parallel bit shift operations. In the example of system 1400, memory 1403 may be a shared memory to store pieces of data having variable lengths and bit shifted pieces of data having variable lengths while central processor 1401 has an internal memory (not shown) to store packed variable length data.

Graphics processor 1402 may include any number and type of graphics processing units that may provide the operations as discussed herein. Such operations may be implemented via software or hardware or a combination thereof. For example, graphics processor 1402 may include circuitry dedicated to generate pieces of variable bit length data and to manipulate variable bit length data pieces of data. Central processor 1401 may include any number and type of processing units or modules that may provide control and other high level functions for system 1400 and to provide bitwise OR operations and byte copy operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory.

In an embodiment, bit shift execution units 1421A-N are implemented via separate execution unit (EUs) of graphics processor 1402. Each EU may include, for example, programmable logic or circuitry such as a logic core or cores that may provide a wide array of programmable logic functions. In an embodiment, bit shift execution units 1421A-N may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where any number of sequential pieces of data having variable bit lengths are attained for packing such that each piece of data includes one or more bits including a lead bit. As used herein the term sequential with respect to pieces of data indicates the data pieces are to be stored in an order provided by the sequence. Furthermore, the term lead bit indicates a first bit of a piece of data. In some embodiments, the sequential pieces of data are generated by a GPU. In some embodiments, the sequential pieces of data are stored in a shared memory that is accessible to the GPU and a CPU. In an embodiment, the sequential pieces of data are stored in memory 1403. The sequential pieces of data are to be packed to generate packed variable length data such that the packed data is packed without gaps and in the sequence provided by the sequential pieces of data. The sequential pieces of data may be any suitable data. In some embodiments, the sequential pieces of data include compressed image data generated by parallel computing operations. In some embodiments, the packed variable length data is packed for serial processing by the CPU.

Processing continues at operation 1302, where bit shift values are determined for at least some of the pieces of data such that each bit shift value indicates a bit shift for each piece of current data to pack post-shift remainder bits from a piece of prior data before the lead bit of the piece of current data. For example, the bit shift for a piece of current data may make room for remainder bits from a piece of prior data in the sequence. The bit shift values may be determined using any suitable technique or techniques. In an embodiment, determining the bit shift values is performed by the CPU. In some embodiments, determining bit shift values includes determining each bit shift value for each piece of data after a first piece of data as a modulo of a sum of bits of pieces of data prior to the each piece of data divided by a byte length (e.g., 8).

Processing continues at operation 1303, where bit shift operations are executed, in parallel with individual ones of multiple EUs of a GPU, for each piece of current data having a bit shift value, such that bit shift operations for each piece of current data are executed on a separate individual one of the EUs. That is, each piece of data is bit shifted by a separate and discrete EU of the GPU. In some embodiments, the bit shift operations are performed by the GPU using a SIMD instruction for each of the individual ones of the execution units. Such resultant bit shifted pieces of data may be stored to the shared memory such as memory 1403 for access via the CPU.

Processing continues at operation 1304, where a first byte of packed variable length data is provided via a CPU to CPU accessible memory such that the first byte includes the post-shift remainder bits from the piece of prior data packed with at least the lead bit of the piece of current data. In some embodiments, providing the first byte comprises the CPU executing an OR operation on a first data set comprising the post-shift remainder bits and a second data set comprising the lead bit and one or more bits of the piece of current data subsequent to the lead bit. In some embodiments, the first data set and the second data set comprise first and second data bytes. In some embodiments, process 1300 further includes providing, via the CPU, a second byte of the packed variable length data to the CPU accessible memory via a copy operation, such that the second byte consists of a portion of the piece of current data. In some embodiments, providing the first and second bytes is part of a memory sync operation to provide the packed variable length data to the CPU accessible memory from a GPU accessible memory storing bit shifted pieces of data. In some embodiments, the sequential pieces of data is a first sequential pieces of data set, and the discussed OR operation is concurrent with execution, in parallel with the individual ones of EUs of the GPU, bit shift operations for a second sequential pieces of data set.

Process 1300 may be repeated any number of times either in series or in parallel for any number of sets of sequential pieces of data or the like. As discussed, process 1300 may provide for packing pieces of data having variable lengths to serial packed data for serial processing. For example, the discussed techniques for packing pieces of data having variable lengths to serial packed data may provide computationally efficient and low power processing.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. In other examples, various components of the systems or devices discussed herein may be provided in a platform as may be found in a server, computer, cloud computing resource, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the processes or any operations discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
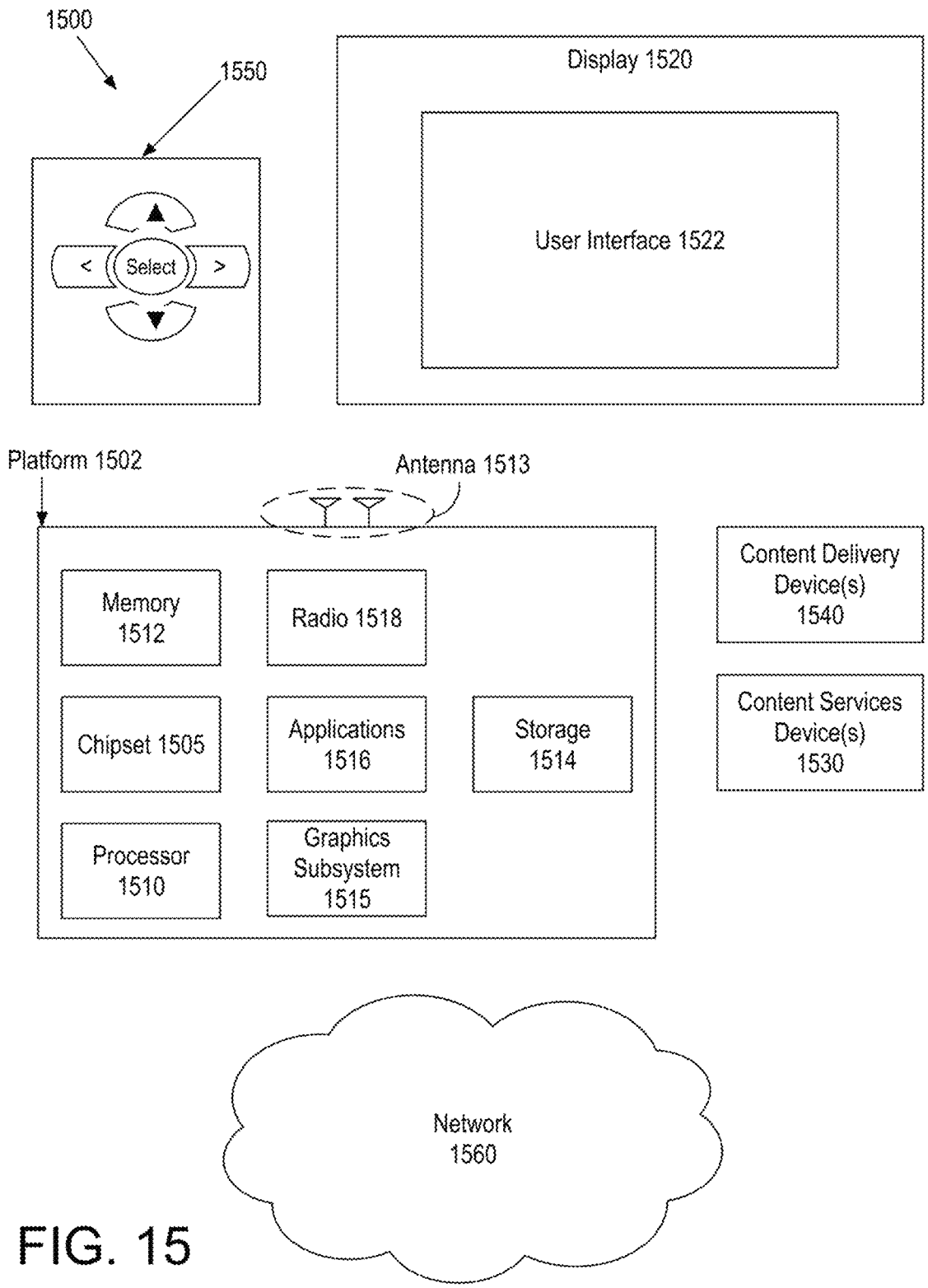
FIG. 15 is an illustrative diagram of an example system.

FIG. 15 is an illustrative diagram of an example system 1500, arranged in accordance with at least some implementations of the present disclosure. In various implementations, system 1500 may be a mobile device or a server device although system 1500 is not limited to this context. For example, system 1500 may be incorporated into a server system, cloud computing resource, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, camera, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
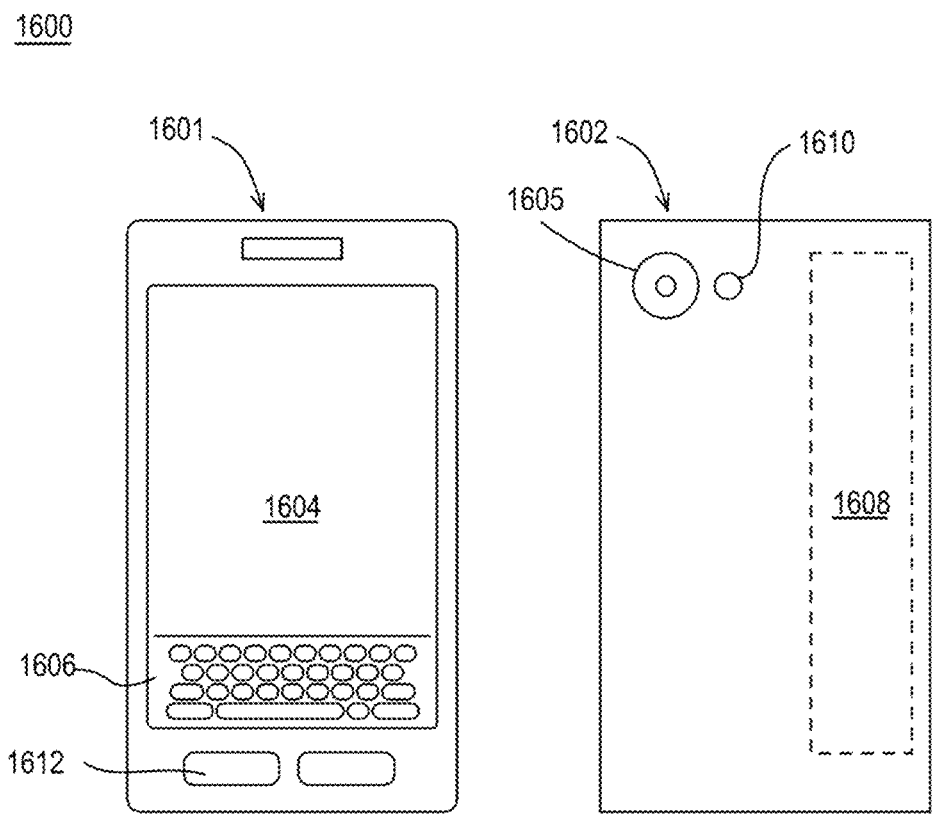
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, system 100 or any other systems, devices, or operations discussed herein may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include a camera 1605 (e.g., including a lens, an aperture, and an imaging sensor) and a flash 1610 integrated into back 1602 (or elsewhere) of device 1600. In other examples, camera 1605 and flash 1610 may be integrated into front 1601 of device 1600 or both front and back cameras may be provided. Camera 1605 and flash 1610 may be components of a camera module to originate image data processed into streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a system for packing variable length data comprises a shared memory to store a plurality of sequential pieces of data having variable bit lengths for packing, each piece of data comprising one or more bits including a lead bit, and at least some of the pieces of data having a corresponding bit shift value, each bit shift value to indicate a bit shift for each piece of current data to pack post-shift remainder bits from a piece of prior data before the lead bit of the piece of current data, a graphics processing unit (GPU) having access to the shared memory, the GPU to execute, in parallel with individual ones of a plurality of execution units of the GPU, bit shift operations for each piece of current data having a bit shift value, wherein bit shift operations for each piece of current data are executed on a separate individual one of the execution units, and a central processing unit (CPU) having access to the shared memory, the CPU to provide a first byte of packed variable length data to a CPU accessible memory, the first byte comprising the post-shift remainder bits from the piece of prior data packed with at least the lead bit of the piece of current data.

In one or more second embodiments, further to the first embodiment, the CPU to provide the first byte comprises the CPU to execute an OR operation on a first data set comprising the post-shift remainder bits and a second data set comprising the lead bit and one or more bits of the piece of current data subsequent to the lead bit.

In one or more third embodiments, further to the first or second embodiments, the first data set and the second data set comprise first and second data bytes.

In one or more fourth embodiments, further to any of the first through third embodiments, the CPU is further to provide a second byte of the packed variable length data to the CPU accessible memory via a copy operation, the second byte consisting of a portion of the piece of current data.

In one or more fifth embodiments, further to any of the first through fourth embodiments, the CPU to provide the first and second bytes comprises a memory sync operation to provide the packed variable length data to the CPU accessible memory from the shared memory comprising bit shifted pieces of data.

In one or more sixth embodiments, further to any of the first through fifth embodiments, the sequential pieces of data comprise a first sequential pieces of data set, and wherein the OR operation is concurrent with execution, in parallel with the individual ones of the execution units of the GPU, bit shift operations for a second sequential pieces of data set.

In one or more seventh embodiments, further to any of the first through sixth embodiments, the bit shift values are determined by the CPU and wherein the bit shift operations by the GPU are executed using a single instruction, multiple data (SIMD) instruction for each of the individual ones of the execution units.

In one or more eighth embodiments, further to any of the first through seventh embodiments, the bit shift values comprise a first bit shift value for a first piece of data as a modulo of a sum of bits of pieces of data prior to the first piece of data divided by a byte length of the first byte.

In one or more ninth embodiments, further to any of the first through eighth embodiments, the packed variable length data comprises a plurality of sequential bytes each at one of a plurality of sequential memory addresses in the CPU accessible memory.

In one or more tenth embodiments, further to any of the first through ninth embodiments, the sequential pieces of data comprise compressed image data generated by parallel computing operations and the packed variable length data is packed for serial processing by the CPU.

In one or more eleventh embodiments, a method for packing variable length data comprises attaining a plurality of sequential pieces of data having variable bit lengths for packing, each piece of data comprising one or more bits including a lead bit, determining bit shift values for at least some of the pieces of data, each bit shift value to indicate a bit shift for each piece of current data to pack post-shift remainder bits from a piece of prior data before the lead bit of the piece of current data, executing, in parallel with individual ones of a plurality of execution units of a graphics processing unit (GPU), bit shift operations for each piece of current data having a bit shift value, wherein bit shift operations for each piece of current data are executed on a separate individual one of the execution units, and providing, via a central processing unit (CPU), a first byte of packed variable length data to CPU accessible memory, the first byte comprising the post-shift remainder bits from the piece of prior data packed with at least the lead bit of the piece of current data.

In one or more twelfth embodiments, further to the eleventh embodiment, providing the first byte comprises the CPU executing an OR operation on a first data set comprising the post-shift remainder bits and a second data set comprising the lead bit and one or more bits of the piece of current data subsequent to the lead bit.

In one or more thirteenth embodiments, further to the eleventh or twelfth embodiments, the first data set and the second data set comprise first and second data bytes.

In one or more fourteenth embodiments, further to any of the eleventh through thirteenth embodiments, the method further comprises providing, via the CPU, a second byte of the packed variable length data to the CPU accessible memory via a copy operation, the second byte consisting of a portion of the piece of current data.

In one or more fifteenth embodiments, further to any of the eleventh through fourteenth embodiments, said providing the first and second bytes comprises a memory sync operation to provide the packed variable length data to the CPU accessible memory from a GPU accessible memory comprising bit shifted pieces of data.

In one or more sixteenth embodiments, further to any of the eleventh through fifteenth embodiments, the sequential pieces of data comprise a first sequential pieces of data set, and wherein the OR operation is concurrent with execution, in parallel with the individual ones of the execution units of the GPU, bit shift operations for a second sequential pieces of data set.

In one or more seventeenth embodiments, further to any of the eleventh through sixteenth embodiments, said determining bit shift values is performed by the CPU and wherein said bit shift operations are performed by the GPU using a single instruction, multiple data (SIMD) instruction for each of the individual ones of the execution units.

In one or more eighteenth embodiments, further to any of the eleventh through seventeenth embodiments, said determining bit shift values comprises determining a first bit shift value for a first piece of data as a modulo of a sum of bits of pieces of data prior to the first piece of data divided by a byte length of the first byte.

In one or more nineteenth embodiments, further to any of the eleventh through eighteenth embodiments, the packed variable length data comprises a plurality of sequential bytes each at one of a plurality of sequential memory addresses in the CPU accessible memory.

In one or more twentieth embodiments, further to any of the eleventh through nineteenth embodiments, the sequential pieces of data comprise compressed image data generated by parallel computing operations and the packed variable length data is packed for serial processing by the CPU.

In one or more twenty-first embodiments, a device or system includes a memory and a processor to perform a method according to any one of the above embodiments.

In one or more twenty-second embodiments, at least one machine readable medium includes a plurality of instructions that in response to being executed on a computing device, cause the computing device to perform a method according to any one of the above embodiments.

In one or more twenty-third embodiments, an apparatus includes means for performing a method according to any one of the above embodiments.

It will be recognized that the embodiments are not limited to the embodiments so described, but can be practiced with modification and alteration without departing from the scope of the appended. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for packing variable length data comprising:
a shared memory to store a plurality of sequential pieces of data having variable bit lengths for packing, each piece of data comprising one or more bits including a lead bit, and at least some of the pieces of data having a corresponding bit shift value, each bit shift value to indicate a bit shift for each piece of current data to pack post-shift remainder bits from a piece of prior data before the lead bit of the piece of current data;
a graphics processing unit (GPU) having access to the shared memory, the GPU to execute, in parallel with individual ones of a plurality of execution units of the GPU, bit shift operations for each piece of current data having a bit shift value, wherein bit shift operations for each piece of current data are executed on a separate individual one of the execution units; and
a central processing unit (CPU) having access to the shared memory, the CPU to provide a first byte of packed variable length data to a CPU accessible memory, the first byte comprising the post-shift remainder bits from the piece of prior data packed with at least the lead bit of the piece of current data.

2. The system of claim 1, wherein the CPU to provide the first byte comprises the CPU to execute an OR operation on a first data set comprising the post-shift remainder bits and a second data set comprising the lead bit and one or more bits of the piece of current data subsequent to the lead bit.

3. The system of claim 2, wherein the first data set and the second data set comprise first and second data bytes.

4. The system of claim 2, wherein the CPU is further to provide a second byte of the packed variable length data to the CPU accessible memory via a copy operation, the second byte consisting of a portion of the piece of current data.

5. The system of claim 4, wherein the CPU to provide the first and second bytes comprises a memory sync operation to provide the packed variable length data to the CPU accessible memory from the shared memory comprising bit shifted pieces of data.

6. The system of claim 2, wherein the sequential pieces of data comprise a first sequential pieces of data set, and wherein the OR operation is concurrent with execution, in parallel with the individual ones of the execution units of the GPU, bit shift operations for a second sequential pieces of data set.

7. The system of claim 1, wherein the bit shift values are determined by the CPU and wherein the bit shift operations by the GPU are executed using a single instruction, multiple data (SIMD) instruction for each of the individual ones of the execution units.

8. The system of claim 1, wherein the bit shift values comprise a first bit shift value for a first piece of data as a modulo of a sum of bits of pieces of data prior to the first piece of data divided by a byte length of the first byte.

9. The system of claim 1, wherein the packed variable length data comprises a plurality of sequential bytes each at one of a plurality of sequential memory addresses in the CPU accessible memory.

10. The system of claim 1, wherein the sequential pieces of data comprise compressed image data generated by parallel computing operations and the packed variable length data is packed for serial processing by the CPU.

11. A method for packing variable length data comprising:
attaining a plurality of sequential pieces of data having variable bit lengths for packing, each piece of data comprising one or more bits including a lead bit;
determining bit shift values for at least some of the pieces of data, each bit shift value to indicate a bit shift for each piece of current data to pack post-shift remainder bits from a piece of prior data before the lead bit of the piece of current data;
executing, in parallel with individual ones of a plurality of execution units of a graphics processing unit (GPU), bit shift operations for each piece of current data having a bit shift value, wherein bit shift operations for each piece of current data are executed on a separate individual one of the execution units; and
providing, via a central processing unit (CPU), a first byte of packed variable length data to CPU accessible memory, the first byte comprising the post-shift remainder bits from the piece of prior data packed with at least the lead bit of the piece of current data.

12. The method of claim 11, wherein providing the first byte comprises the CPU executing an OR operation on a first data set comprising the post-shift remainder bits and a second data set comprising the lead bit and one or more bits of the piece of current data subsequent to the lead bit.

13. The method of claim 12, further comprising:
providing, via the CPU, a second byte of the packed variable length data to the CPU accessible memory via a copy operation, the second byte consisting of a portion of the piece of current data.

14. The method of claim 12, wherein the sequential pieces of data comprises a first sequential pieces of data set, and wherein the OR operation is concurrent with execution, in parallel with the individual ones of the execution units of the GPU, bit shift operations for a second sequential pieces of data set.

15. The method of claim 11, wherein said determining bit shift values is performed by the CPU and wherein said bit shift operations are performed by the GPU using a single instruction, multiple data (SIMD) instruction for each of the individual ones of the execution units.

16. The method of claim 11, wherein said determining bit shift values comprises determining a first bit shift value for a first piece of data as a modulo of a sum of bits of pieces of data prior to the first piece of data divided by a byte length of the first byte.

17. At least one non-transitory machine readable medium comprising a plurality of instructions that, in response to being executed on a computing device, cause the computing device to pack variable length data by:
attaining a plurality of sequential pieces of data having variable bit lengths for packing, each piece of data comprising one or more bits including a lead bit;
determining bit shift values for at least some of the pieces of data, each bit shift value to indicate a bit shift for each piece of current data to pack post-shift remainder bits from a piece of prior data before the lead bit of the piece of current data;
executing, in parallel with individual ones of a plurality of execution units of a graphics processing unit (GPU), bit shift operations for each piece of current data having a bit shift value, wherein bit shift operations for each piece of current data are executed on a separate individual one of the execution units; and
providing, via a central processing unit (CPU), a first byte of packed variable length data, the first byte comprising the post-shift remainder bits from the piece of prior data packed with at least the lead bit of the piece of current data in CPU accessible memory.

18. The non-transitory machine readable medium of claim 17, wherein providing the first byte comprises the CPU executing an OR operation on a first data set comprising the post-shift remainder bits and a second data set comprising the lead bit and one or more bits of the piece of current data subsequent to the lead bit.

19. The non-transitory machine readable medium of claim 18, further comprising:
providing, via the CPU, a second byte of the packed variable length data to the CPU accessible memory via a copy operation, the second byte consisting of a portion of the piece of current data.

20. The non-transitory machine readable medium of claim 18, wherein the sequential pieces of data comprises a first sequential pieces of data set, and wherein the OR operation is concurrent with execution, in parallel with the individual ones of the execution units of the GPU, bit shift operations for a second sequential pieces of data set.

* * * * *